United States Patent [19]

Middleton et al.

[11] Patent Number: 5,353,022

[45] Date of Patent: Oct. 4, 1994

[54] AIRPLANE TAKEOFF AND LANDING PERFORMANCE MONITORING SYSTEM

[75] Inventors: David B. Middleton; Raghavachari Srivatsan; Lee H. Person, Jr., all of Yorktown, Va.

[73] Assignee: The United States of America as represented by the Administrator of the National Aeronautics and Space Administration, Washington, D.C.

[21] Appl. No.: 45,337

[22] Filed: Apr. 6, 1993

Related U.S. Application Data

[63] Continuation of Ser. No. 755,248, Sep. 5, 1991, abandoned, which is a continuation-in-part of Ser. No. 192,562, May 11, 1988, Pat. No. 5,047,942, which is a continuation-in-part of Ser. No. 82,766, Aug. 6, 1987, Pat. No. 4,843,554.

[51] Int. Cl.$^5$ .............................................. G08B 21/00
[52] U.S. Cl. .................................. 340/959; 73/178 T; 364/427
[58] Field of Search ........................ 340/959; 73/178 T; 364/427, 428

[56] References Cited

U.S. PATENT DOCUMENTS

| | | |
|---|---|---|
| 4,251,868 | 2/1981 | Aron et al. ........................ 73/178 T |
| 4,638,437 | 1/1987 | Cleary et al. ..................... 340/959 |
| 4,837,695 | 6/1989 | Baldwin ............................ 73/178 T |
| 4,843,554 | 6/1989 | Middleton et al. ............... 73/178 T |
| 4,980,833 | 12/1990 | Milligan et al. ................. 73/178 T |
| 5,047,942 | 9/1991 | Middleton et al. ............... 73/178 T |
| 5,103,224 | 4/1992 | Arad .................................... 340/959 |

Primary Examiner—Brent Swarthout
Attorney, Agent, or Firm—Kimberly A. Chasteen

[57] ABSTRACT

The invention is a real-time takeoff and landing performance monitoring system for an aircraft which provides a pilot with graphic and metric information to assist in decisions related to achieving rotation speed (VR) within the safe zone of a runway, or stopping the aircraft on the runway after landing or take-off abort. The system processes information in two segments: a pretakeoff segment and a real-time segment. One-time inputs of ambient conditions and airplane configuration information are used in the pretakeoff segment to generate scheduled performance data. The real-time segment uses the scheduled performance data, runway length data and transducer measured parameters to monitor the performance of the airplane throughout the takeoff roll. Airplane acceleration and engine-performance anomalies are detected and annunciated. A novel and important feature of this segment is that it updates the estimated runway rolling friction coefficient. Airplane performance predictions also reflect changes in head wind occurring as the takeoff roll progresses. The system provides a head-down display and a head-up display. The head-up display is projected onto a partially reflective transparent surface through which the pilot views the runway. By comparing the present performance of the airplane with a continually predicted nominal performance based upon given conditions, performance deficiencies are detected by the system and conveyed to pilot in form of both elemental information and integrated information.

22 Claims, 18 Drawing Sheets

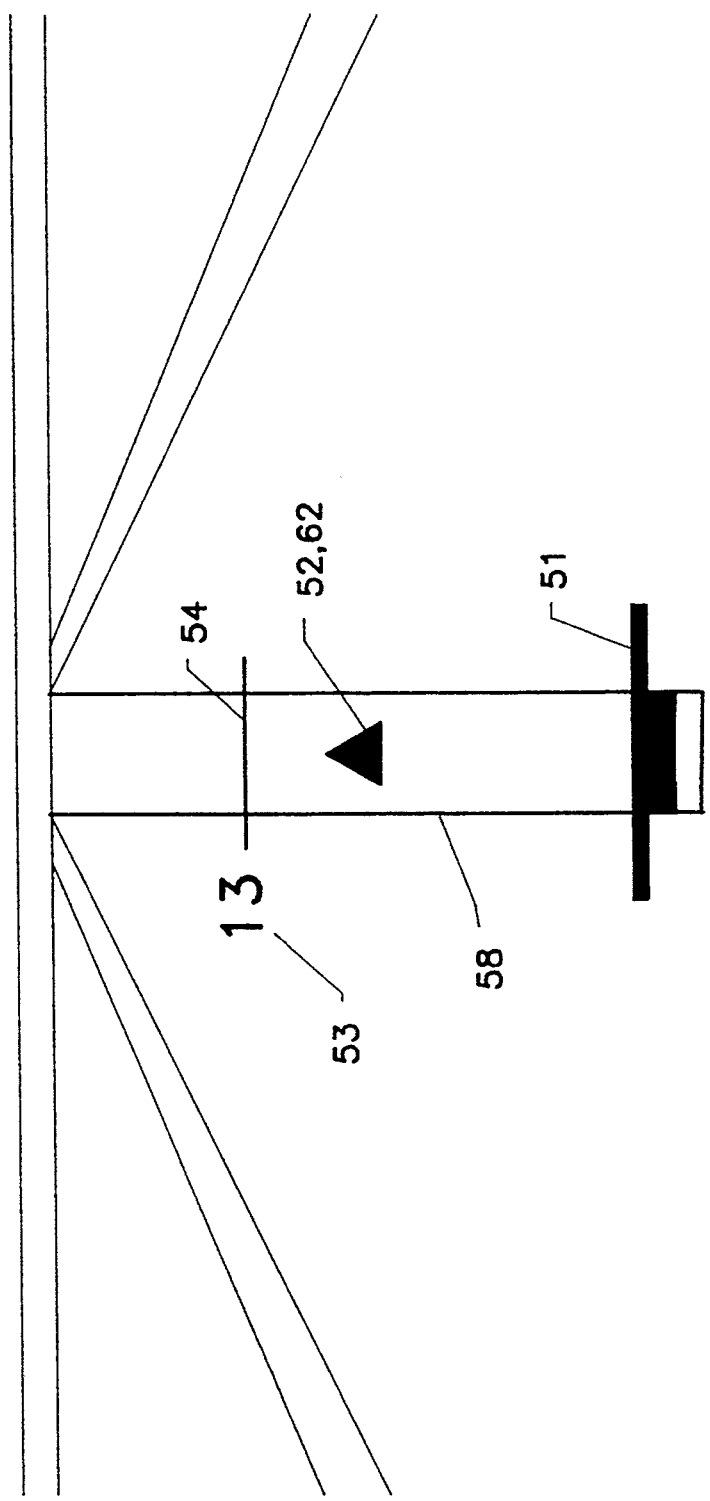

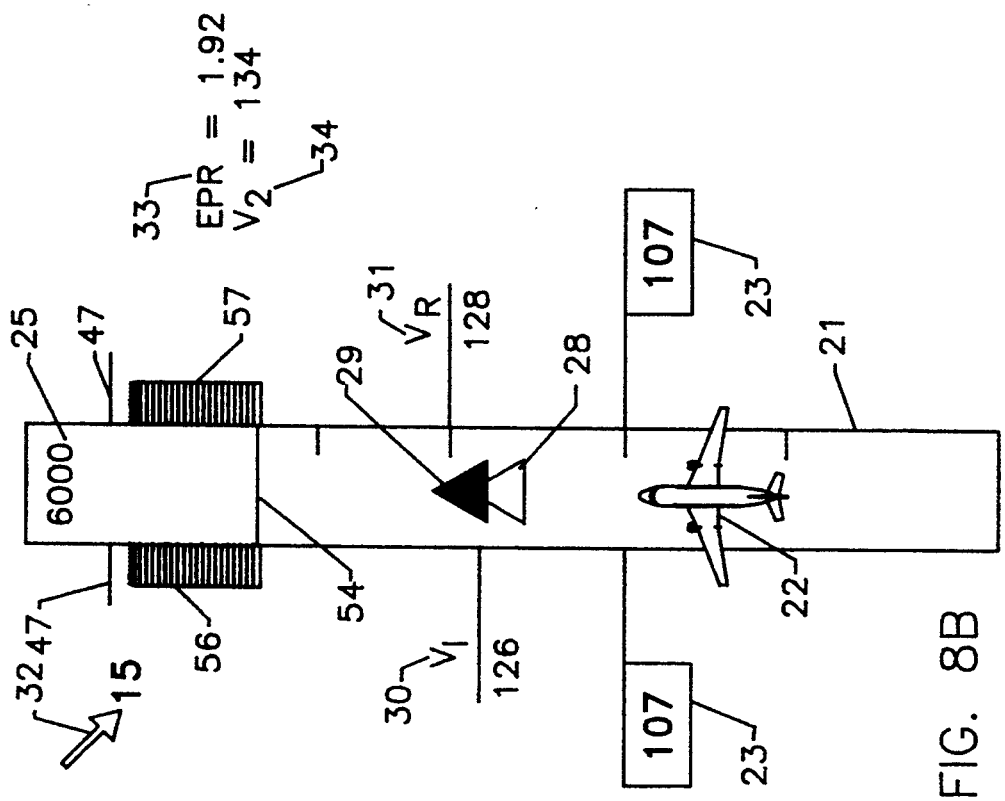
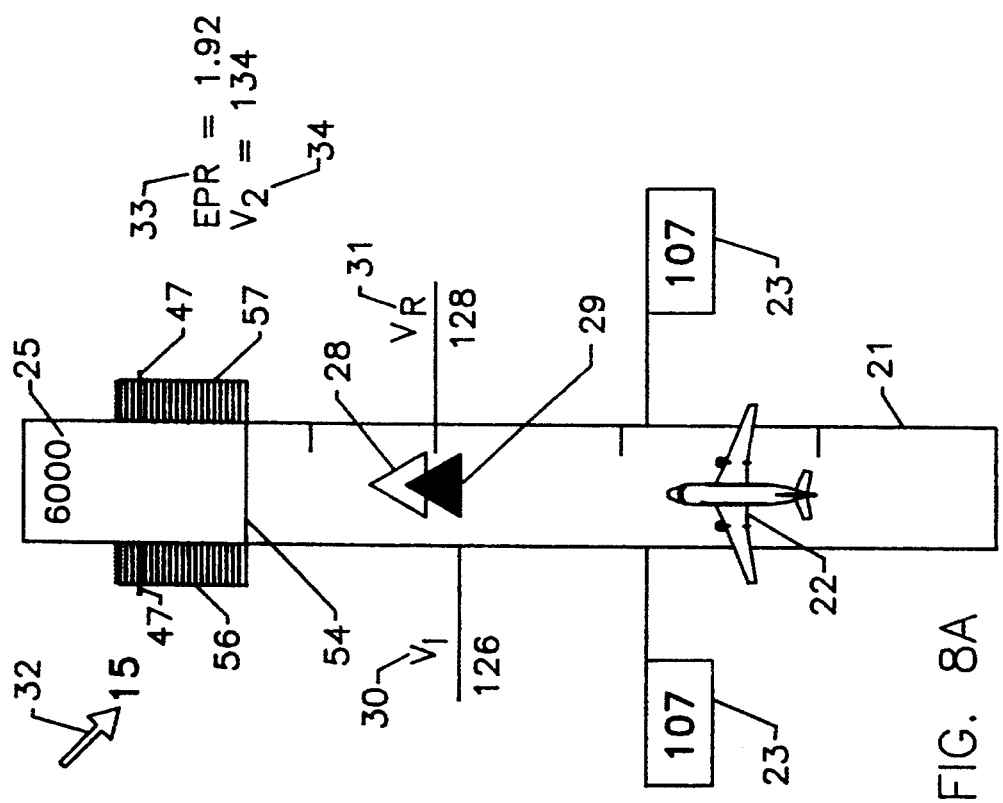
FIG. 8A
FIG. 8B

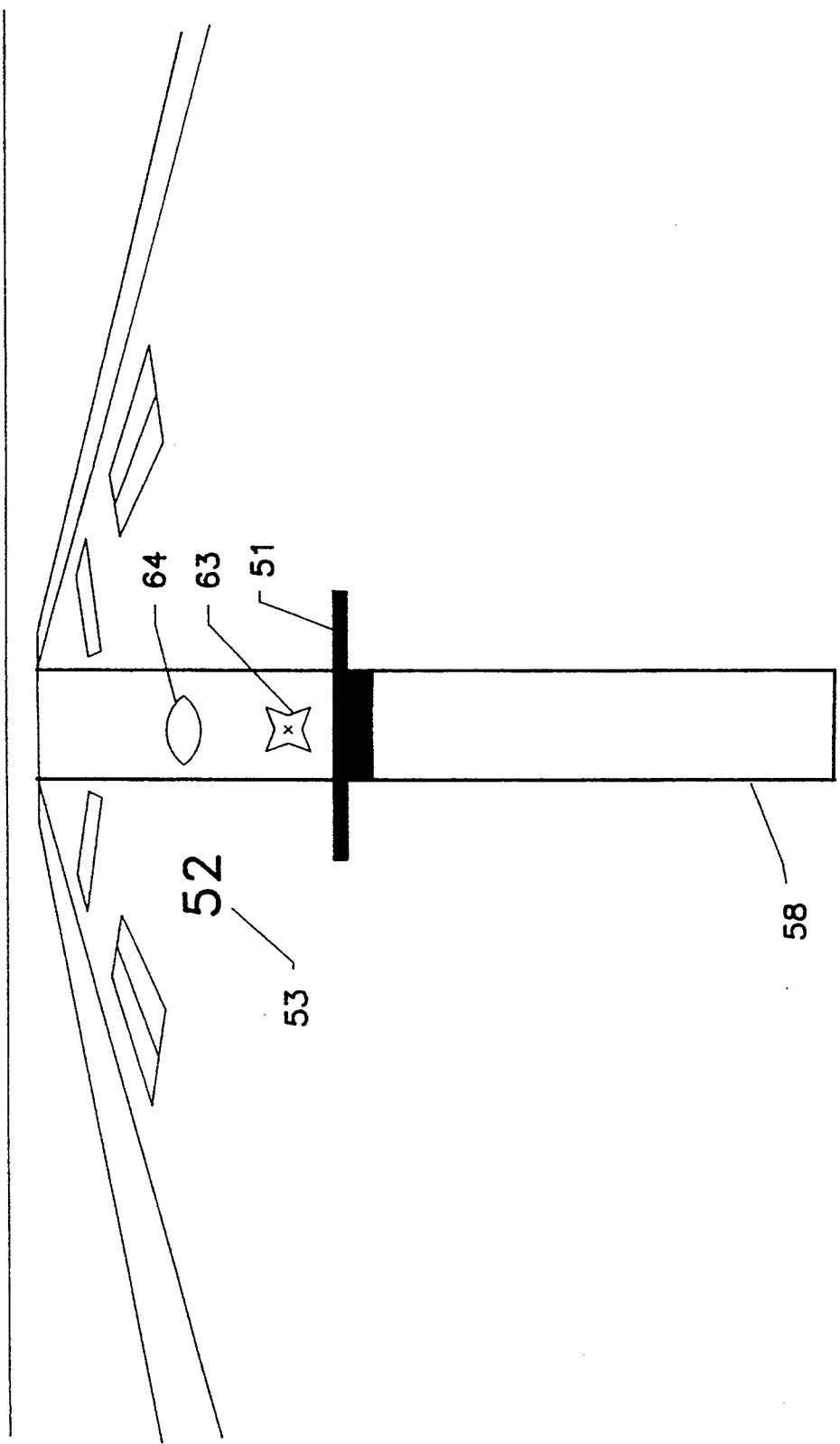

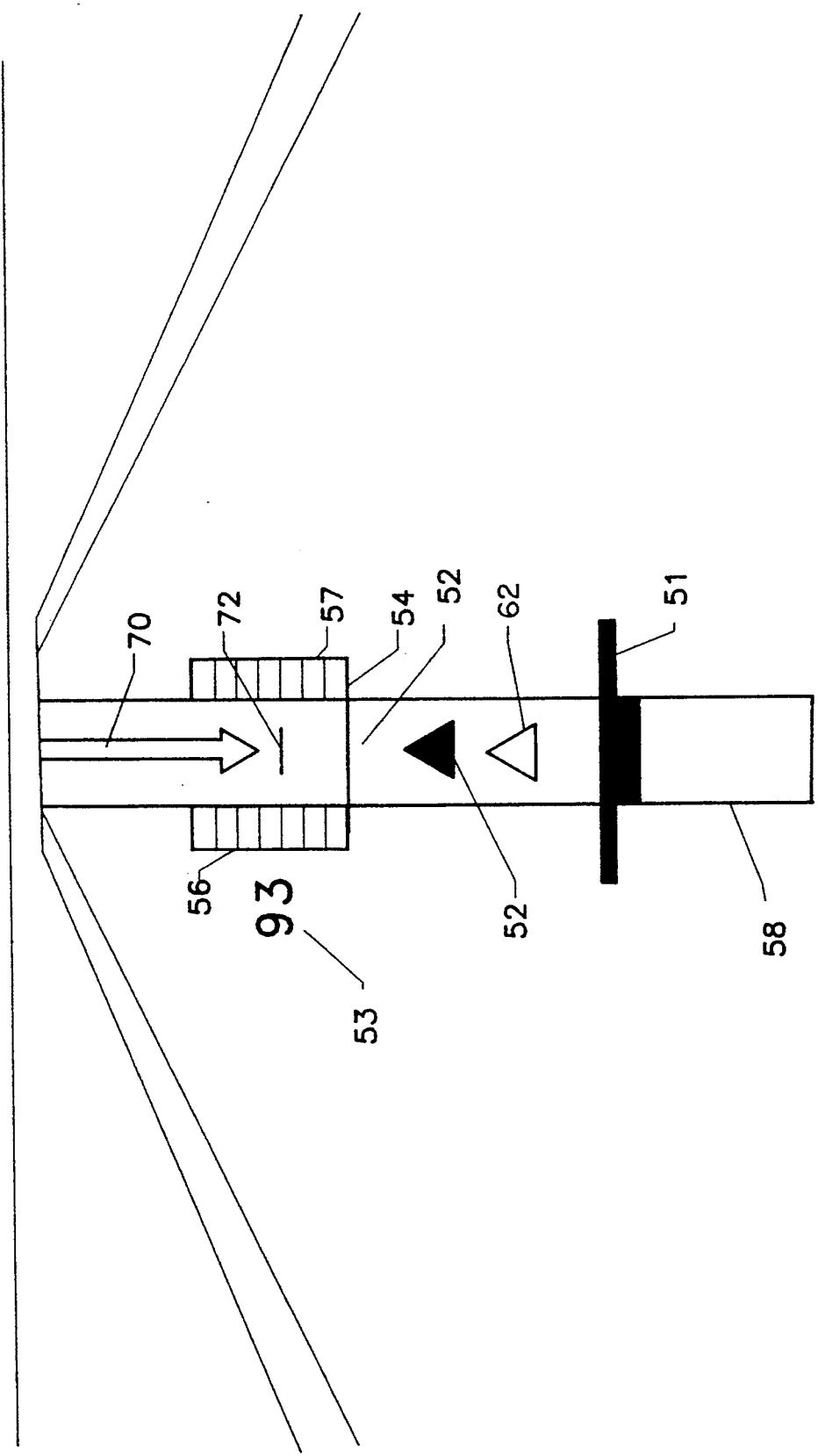

AIRPLANE TAKEOFF AND LANDING PERFORMANCE MONITORING SYSTEM

ORIGIN OF THE INVENTION

The invention described herein was jointly made by employees of the United States Government and a contract employee in the performance of work under NASA Grant No. 31-79, and is subject to the provisions of Public Law 96-517 (35 USC 202) in which the contractor has elected not to retain title.

CROSS REFERENCE TO RELATED APPLICATIONS

This is a continuing application of copending application(s) Ser. No. 07/755,248 filed on Sep. 5, 1991 and now abandoned, which is a continuation-in-part of U.S. patent application Ser. No. 07/192,562, now U.S. Pat. No. 5,047,942, filed May 11, 1988 which is a continuation-in-part of Ser. No. 082,766, filed Aug. 6, 1987, U.S. Pat. No. 4,843,554.

BACKGROUND OF THE INVENTION

1. Field of the Invention

The invention is related to the field of measuring and testing and more particularly to a takeoff and landing performance monitoring system.

2. Description of the Prior Art

Prior art includes takeoff and landing performance monitoring systems which graphically display the position of an airplane on a runway relative to symbols which indicate (1) whether an option is still available, and (2) how much margin remains before the option becomes unavailable. For instance, see U.S. Pat. No. 4,638,437, Jan. 20, 1987, Cleary et al. Thus, the pilot using such an airplane performance monitoring system receives only an indication that, using maximum thrust, the airplane is still capable of achieving a desired result, not an indication of whether this result can be achieved using scheduled thrust. Further, it does not indicate where on the runway particular speeds are expected to occur or where the airplane can be stopped from current position and speed.

A further limitation of the prior art is that once an estimate of the coefficient of rolling friction is input prior to takeoff, it remains constant. Likewise, the prior art fails to compensate for any change in the head wind during the takeoff run.

Another limitation of the prior art is that valuable status information, such as engine status and operating level are not displayed.

A further limitation of the prior art is that takeoff and stopping information are provided on two sides of the display, rather than being integrated into a single channel that controls an advisory flag.

OBJECTS AND SUMMARY

An object of this invention is to improve upon the prior art by continuously evaluating the status of the airplane and immediately annunciating performance deficiencies, thereby informing the pilot of deficiencies while time for corrective action may still be available.

A further object of the present invention is to monitor the amount of runway already used as well as the amount of runway which can be used to achieve rotation speed or bring the airplane to a complete stop.

Another object of the present invention is to be responsive to differing ambient conditions, such as temperature, pressure altitude, runway winds, runway rolling friction coefficient, wing flap setting, and airplane loading characteristics such as weight and center of gravity.

Another object of the present invention is to provide a head-up display which provides airplane performance information to a pilot while he continues to watch the runway.

Another object of the present invention is to provide a head-up display in conjunction with a head-down display, thereby furnishing essential information to the pilot-flying via the head-up display and furnishing detailed information to the pilot-not-flying via the head-down display.

A further object of the present invention is to provide status information to the pilot-flying by means of easily recognizable and distinguishable symbols focused at infinity and projected onto a transparent screen on or near the aircraft windshield.

Another object of the present invention is to provide a display warning the pilot that the airplane flap lever is in the wrong position for takeoff.

The invention is an airplane takeoff and landing performance monitoring system which utilizes runway ambient condition, flap setting, and airplane loading characteristic information, input both manually and continuously from transducers to a computer, to generate acceleration history curves for predicting airplane performance during takeoff and landing. The results of the airplane performance predictions are compared with measured performance during the progress of the airplane down the runway, and are depicted on both a head-up and a head-down display driven by the computer. An improved estimate of the runway coefficient of rolling friction may be derived by comparing measured with predicted performance.

The take-off and landing performance monitoring system provides the pilot with graphic and metric information to assist in decisions related to achieving rotation speed ($V_R$) within the safe zone of the runway or stopping the aircraft on the runway after landing or take-off abort.

One-time inputs of ambient temperature, pressure altitude, runway wind, airplane gross weight, center of gravity, selected flap and stabilizer setting are utilized in generating a set of standard acceleration-performance data. Runway length available for rotation, runway length available for stopping, an estimated runway rolling-friction coefficient and instantaneous measurements of throttle position, engine pressure ratios, ground speed, calibrated air speed, along-track acceleration, and ground speed are used in computing engine parameters and airplane acceleration, monitoring the runway distance used and runway distance remaining in predicting the runway distance needed to achieve rotation speed, and the runway needed to stop the airplane. A comparison of measured and predicted values is utilized in detecting performance deficiencies. These comparisons and the runway length computations lead to GO/ABORT signals. An important feature of the algorithm is that the estimated runway rolling friction is updated based on measured acceleration performance, resulting in more accurate predictions of future performance. Airplane performance predictions also reflect changes in head wind occurring as the takeoff roll progresses.

The head-down display indicates the position of the airplane on the runway, indicating runway used and runway available (to the ground roll limit line and to the end of the runway), summarizes the critical information into a single situation advisory flag, shows engine failures and off-nominal acceleration performance, and indicates where on the runway particular events such as decision speed ($V_1$), rotation speed ($V_R$) and expected stop points will occur based on both measured and predicted performance. This display also indicates air speed, wind vector, recommended and measured engine pressure ratios (EPR), second-segment climb speed, and minimum field length (MFL).

The head-up display features a subset of the information available on the head-down display. It presents information such as measured EPR, off-nominal acceleration, air speed, current position, ground roll limit line, expected point where rotation speed will occur, and predicted stop points.

DESCRIPTION OF THE DRAWINGS

Other objects, features, and advantages of the invention will become apparent from the following detailed description of some preferred embodiments when read in conjunction with the appended drawings wherein:

FIG. 7E depicts the head-up display presented to the pilot at the beginning of takeoff under typical conditions;

FIG. 8A shows the head-down display indicating that airplane thrust performance exceeds nominal values;

FIG. 8B shows the head-down display indicating sub-nominal airplane thrust performance (but within acceptable limits);

FIG. 10B depicts the head-up display indicating a similar landing or abort condition; and FIG. 11 depicts the head-up display having an acceleration-error arrow.

DETAILED DESCRIPTION OF THE INVENTION

Figure 1:
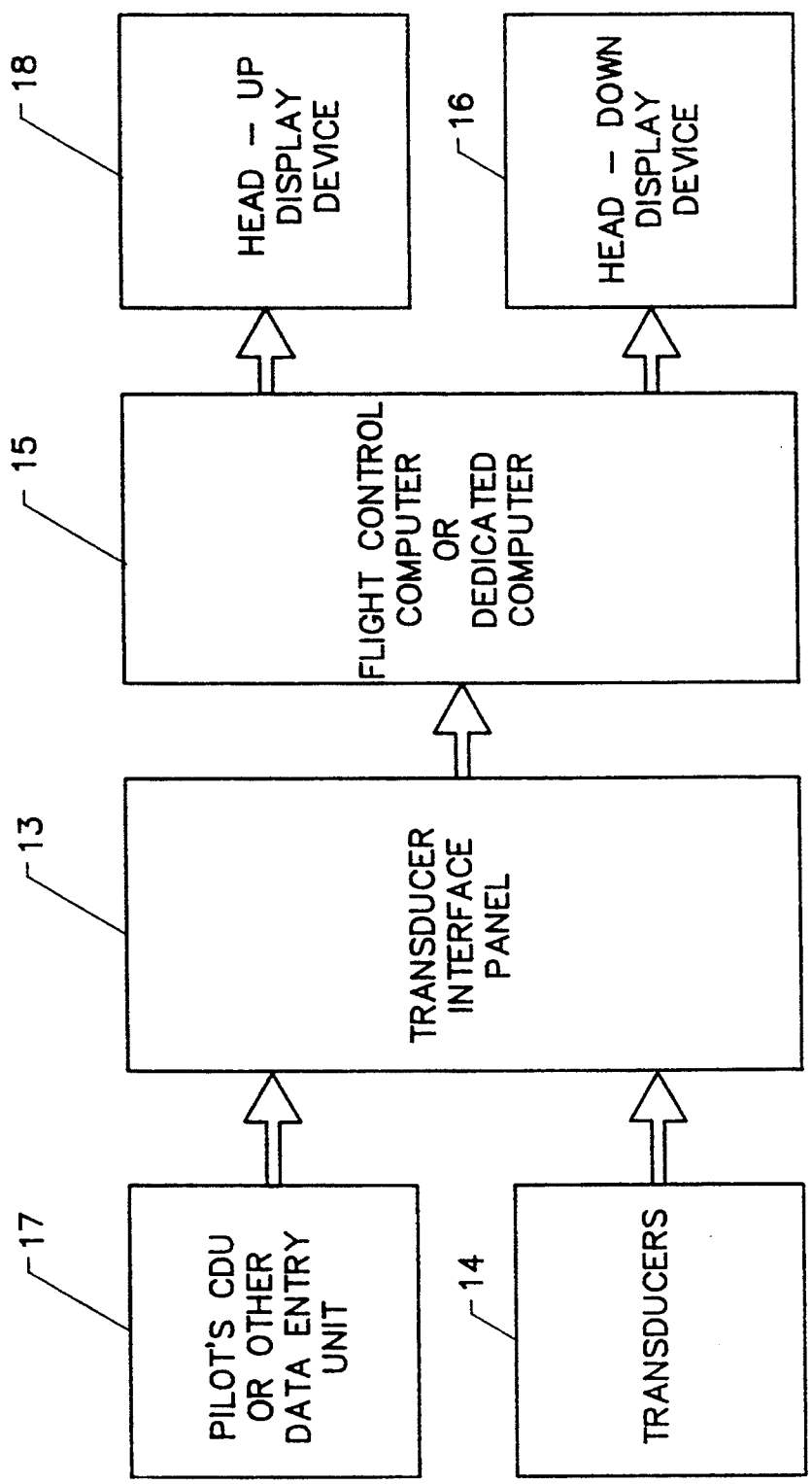
FIG. 1 is a block diagram of the invention.

A preferred embodiment of a system in accordance with the invention is illustrated in FIG. 1, as generally comprising a plurality of transducers 14 for measuring parameters affecting airplane performance, a computer means 15 for receiving and operating upon input data from said plurality of transducers and for driving displays 16,17 arranged to graphically depict status information in an easily monitored format.

Conventional transducers 14 may be used to measure throttle position, engine pressure ratio, ground speed, along-track acceleration and calibrated air speed. As is well known, these transducers 14 may be positioned throughout the airplane, their outputs being collected at the cockpit and incorporated in to a conventional instrument panel such as may be found in a Boeing 737 manufactured by the Boeing Company. In the present invention, these transducer outputs are gathered together at a transducer interface panel 13, whence they become inputs to the computer means 15.

The preferred embodiment incorporates the flight control computer of the airplane, especially, a Norden model 11/70, as computer means 15; in this case, the inputs from many of the transducers are interfaced to the computer means 15 by the airplane manufacturer. Alternatively, many commercially available computers, such as a Digital Equipment Corp. microVAX, provide an acceptable substitute.

Ambient temperature and pressure, runway wind, airplane weight, flap and stabilizer settings can be input from transducers 14 or manually, using a device such as the Navigation and Control Display Unit (NCDU) found in the Boeing 737-300 or -400 equivalent data entry device compatible with the selected computer means. The NCDU 17, which normally is used to enter navigational and other information into the flight control computer of the airplane, also serves as an input device in the preferred embodiment of the takeoff and landing performance monitoring system.

As will be explained, algorithms within the computer 15 operate on the input data to generate a prediction of the airplane's acceleration performance. During the progress of the airplane down the runway, these predictions are compared with measured airplane performance. Performance anomalies are determined and new predictions are made, taking into account the most recently measured performance data.

After the computer means 15 receives and operates upon selected information from the NCDU and the transducers 14, the results are transmitted to the head-down display device 16 and to the head-up display device 18 using computer-to-display interfacing techniques familiar to those skilled in the art. The preferred embodiment can utilize existing Horizontal Situation Indicator (HSI) screens found in many modern transports, e.g., Boeing 737, 757, and 767, as a head-down display device. However, as is known, a dedicated device such as a Sperry Arinc size D display could also be used. The HSI head-down display device 16 usually accommodates a map display used for navigation; however, while the airplane is on the ground this device serves as display unit for the takeoff and landing performance monitoring system. Once liftoff occurs, the takeoff and landing performance monitoring system head-down display is replaced by the normal HSI information. The head-up display 18 is accomplished by projecting, focused at infinity, displayed information onto a partially reflective transparent screen utilizing techniques familiar to those skilled in the art. During flight, projection of takeoff performance monitoring system information ceases. The preferred embodiment of the invention incorporates both a head-up and a head-down display; however, the invention may be practiced using either display independently.

The system in accordance with the invention monitors takeoff and landing performance by continuously comparing the actual performance of the airplane with a predicted nominal performance, including predictions of the runway length needed to attain rotation speed, the distance required to stop the airplane, and the remaining runway length.

At any point during the takeoff roll, the amount of additional runway required to achieve rotation speed is a function of the instantaneous speed of the airplane and how well it will accelerate until rotation speed is achieved. The instantaneous acceleration of the airplane is given by $$a = \frac{Th - D - \mu(W - L)}{m} \tag{1}$$

where
$a$ = Acceleration (feet/sec/sec)
$Th$ = Thrust (lbs)
$D$ = drag (lbs)
$\mu$ = rolling friction coefficient
$L$ = lift (lbs)
$m$ = mass = $W/g$ (slugs)
$g$ = gravitational acceleration (feet/sec/sec)
$W$ = weight (lbs)

Figure 2:
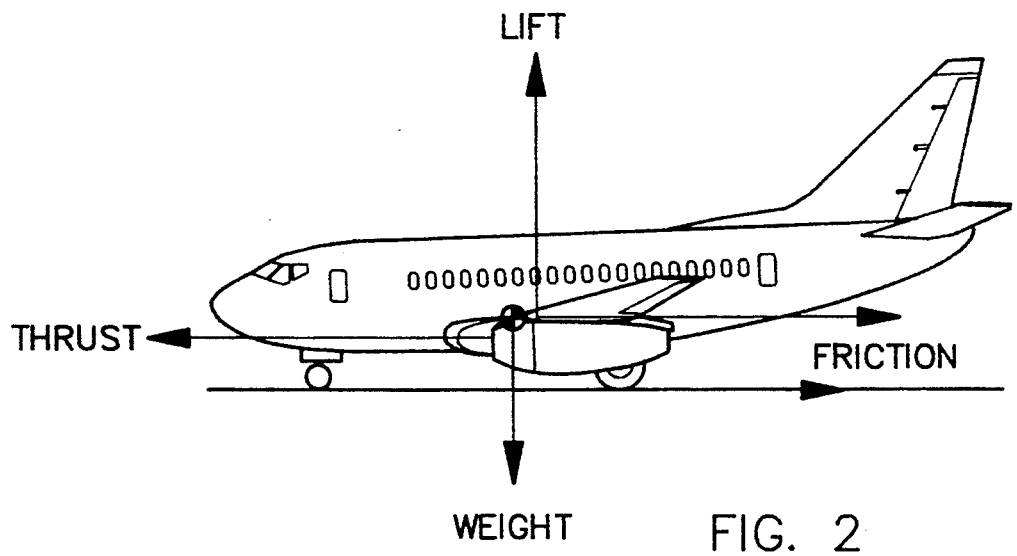
FIG. 2 depicts the instantaneous forces acting on an airplane during takeoff roll.

FIG. 2 shows the forces acting on the airplane. The thrust varies with throttle setting and air speed and the friction coefficient depends on runway and tire condition.

Airplane acceleration represents a composite measure of the performance of the airplane; therefore, performance deficiencies can be detected by comparing actual instantaneous acceleration with a predicted nominal value.

The takeoff and landing performance monitoring system algorithm consists of two segments: a pretakeoff segment and a real-time segment. For each takeoff, the pretakeoff segment is utilized to generate nominal performance data particular to that takeoff run. The real-time segment keeps track of the runway (distance) used, the runway remaining, the runway needed to achieve rotation speed, and the runway needed to bring the airplane to a complete stop. These lengths and a comparison of the actual airplane performance with the nominal value from the pretakeoff segment are used in the GO/ABORT recommendation.

In the pretakeoff segment, the airplane acceleration performance is predicted for two extreme values of rolling friction coefficients: a low value ($\mu=0.005$) and a high value ($\mu=0.040$) using the inputs: pressure altitude, ambient temperature, runway wind, runway slope, airplane weight, center of gravity location, selected flap setting and a throttle movement to a selected position.

Figure 3:
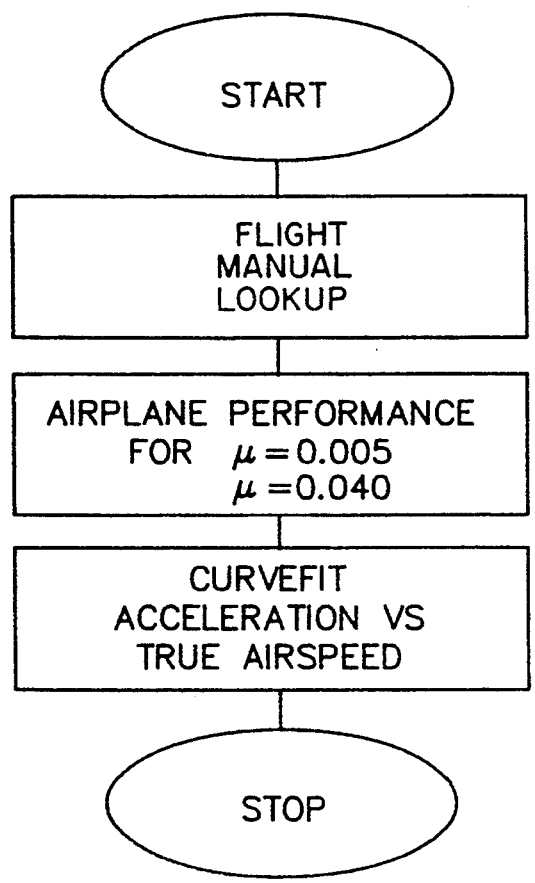
FIG. 3 is a flowchart of the pretakeoff segment.

The pretake off segment of the algorithm consists of three parts as shown in FIG. 3, and can be run off-line on tile on-board computer 15 or on ground support computers (not shown) with the results downloaded to the airplane computers.

The first part performs a flight manual look-up to determine the recommended engine pressure ratio (EPR) for takeoff, the decision speed ($V_1$), the rotation speed ($V_R$) and the second segment climb speed ($V_2$). The throttle setting needed to achieve the engine pressure ratio is also computed.

Figure 4A:
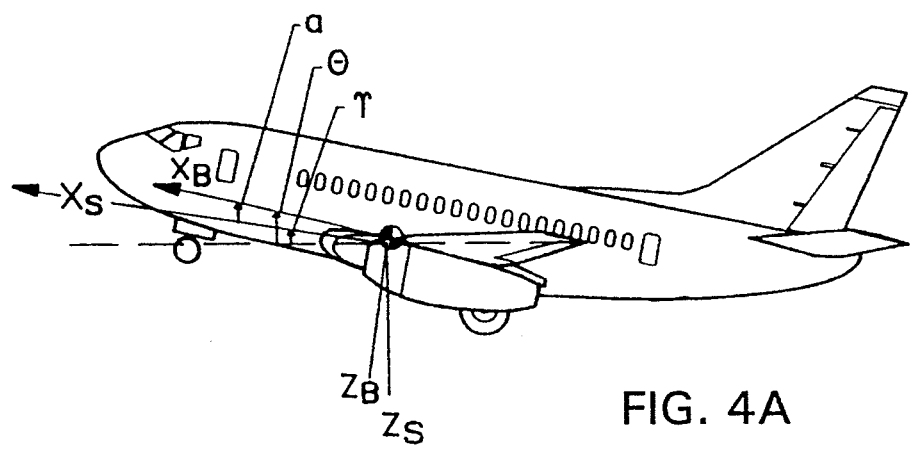
FIGS. 4A-C depict the axes system used in analyzing the forces acting on the airplane.
Figure 4B:
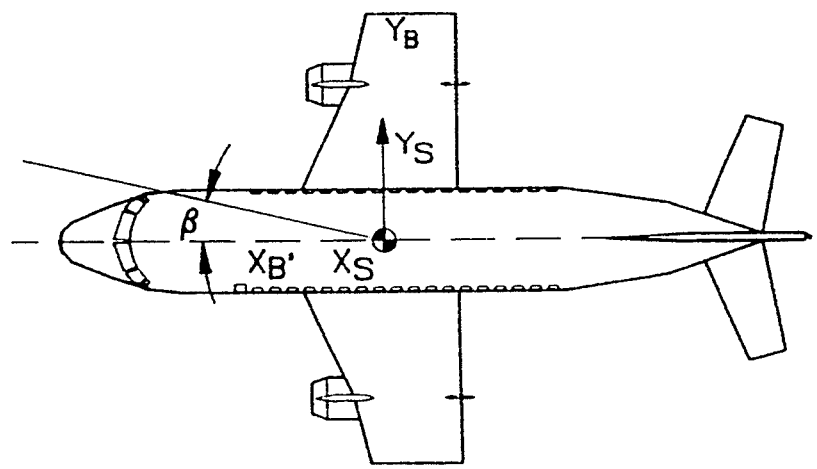
Figure 4C:
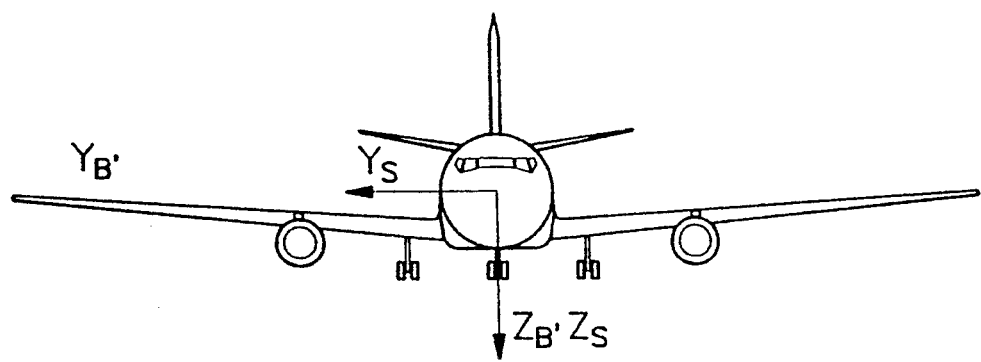

The second part of this segment computes the "scheduled or nominal acceleration" performance of the airplane as follows. First the aerodynamic coefficients are extracted from the aerodynamic data base for the airplane as a function of the motion variables. The aerodynamic forces (F) and moments (M) are computed in the stability axis system of the airplane. These forces and moments are then transformed into the body axis system (as seen in FIG. 4). The components of the engine forces ($THR_{XB}$ and $THR_{ZB}$) and moments ($THR_{MB}$) along the body axes are determined using a manufacturer-supplied engine model. A manufacturer-supplied landing gear model is utilized in computing the forces ($LG_{XB}$ and $LG_{ZB}$) and moments ($LG_{MB}$) generated by it along the body axis system.

The resultant forces ($F_{XBtotal}$ and $F_{ZBtotal}$) acting through the center of gravity along the body X and Z axes are obtained as $$F_{XBtotal} = F_{XB} + THR_{XB} + L_{GXB} \tag{2}$$

$$F_{ZBtotal} = F_{ZB} + THR_{ZB} + L_{GZB}. \tag{3}$$

The resultant moment $M_{Btotal}$ about the body Y-axis (the pitching moment) is given by $$M_{Btotal} = M_B + THR_{MB} + L_{GMB}. \tag{4}$$

Using these forces, moments and body X and Z components of gravitational acceleration, the airplane acceleration along the body axes is $$\dot{u}_B = (F_{XBtotal} \div m) - g\sin\theta_B - q_B w_B \tag{5a}$$

$$\dot{w}_B = (F_{ZBtotal} \div m) - g\cos\theta_B + q_B u_B \tag{5b}$$

$$\dot{H}_{CG} = u_B \sin\theta - w_B \cos\theta \tag{5c}$$

where $\theta$ is defined in FIG. 4, $q_B$ is the angular velocity about the $y_B$ axis, $w_B$ is the speed along the $Z_B$-axis and $u_B$ is the speed along the $X_B$-axis and $p_B = r_B = 0$.

The pitching moment $M_{Btotal}$ and the body Y-axis moment of inertia ($I_{yy}$) are used in computing the pitch acceleration using $$\dot{Q}_B = M_{Btotal} \div I_{YY}. \tag{6}$$

The rate of change of pitch attitude is written as $$\dot{\theta}_B = q_B. \tag{7}$$

The parameters ($\dot{\theta}_B$, $\dot{u}_B$, $\dot{H}_{CG}$, $\dot{w}_B$, $\dot{q}_B$, $v_G$) are integrated using a second order Adams-Bashworth numerical integration scheme $$x_{n+1} = x_n + (\Delta T/2)(3x_n - x_{N-1}) \tag{8}$$

to obtain new values for $\theta_B$, $u_B$, $H_{CGY}$, $w_B$, $q_B$, $D_{RWY}$. Throttle position serves as the input to a throttle servo with the following dynamics:

$$\delta_{th}(n\Delta T) = \xi \delta_{th}[(n-1)\Delta T] + (1-\xi)\delta_{thc}(n\Delta T). \tag{9}$$

The last part of this segment deals with curve fitting the along track acceleration, a, as a function of the airplane true air speed, $V_T$, to generate a set of coefficients for a "nominal performance" data set for the takeoff run. A least-square-error cubic polynomial curve fit method is utilized to generate $$a = A_0 + A_1 v_T + A_2 v_T^2 + A_3 v_T^3. \tag{10}$$

Figure 5:
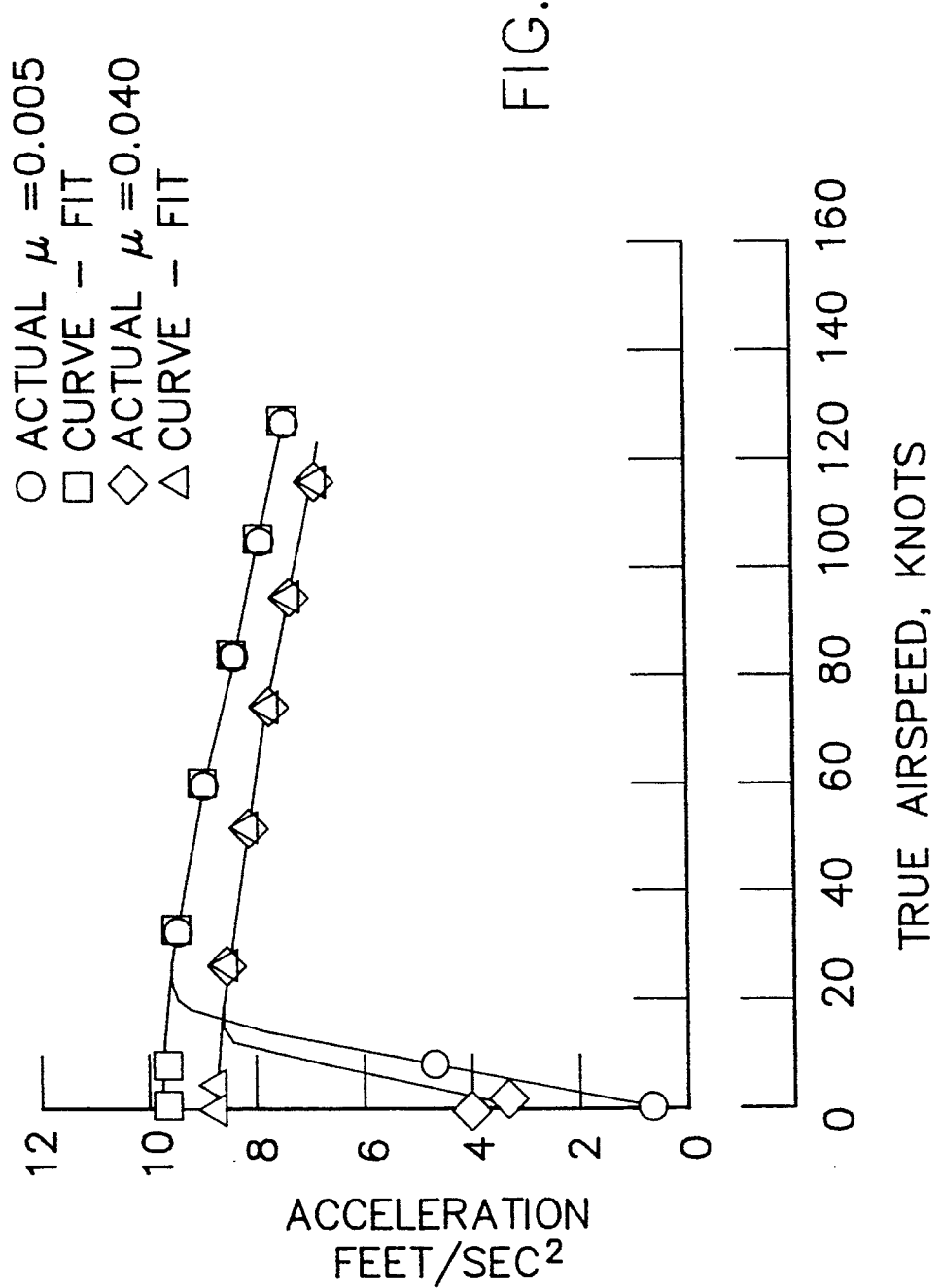
FIG. 5 is an example of two acceleration history curves generated by the takeoff and landing performance monitoring system for two extreme friction conditions having otherwise similar takeoff conditions.

This process is carried out twice; once for the low friction coefficient and a second time for the high friction coefficient. FIG. 5 illustrates the results obtained from the pretakeoff segment for one set of typical takeoff conditions.

Figure 6:
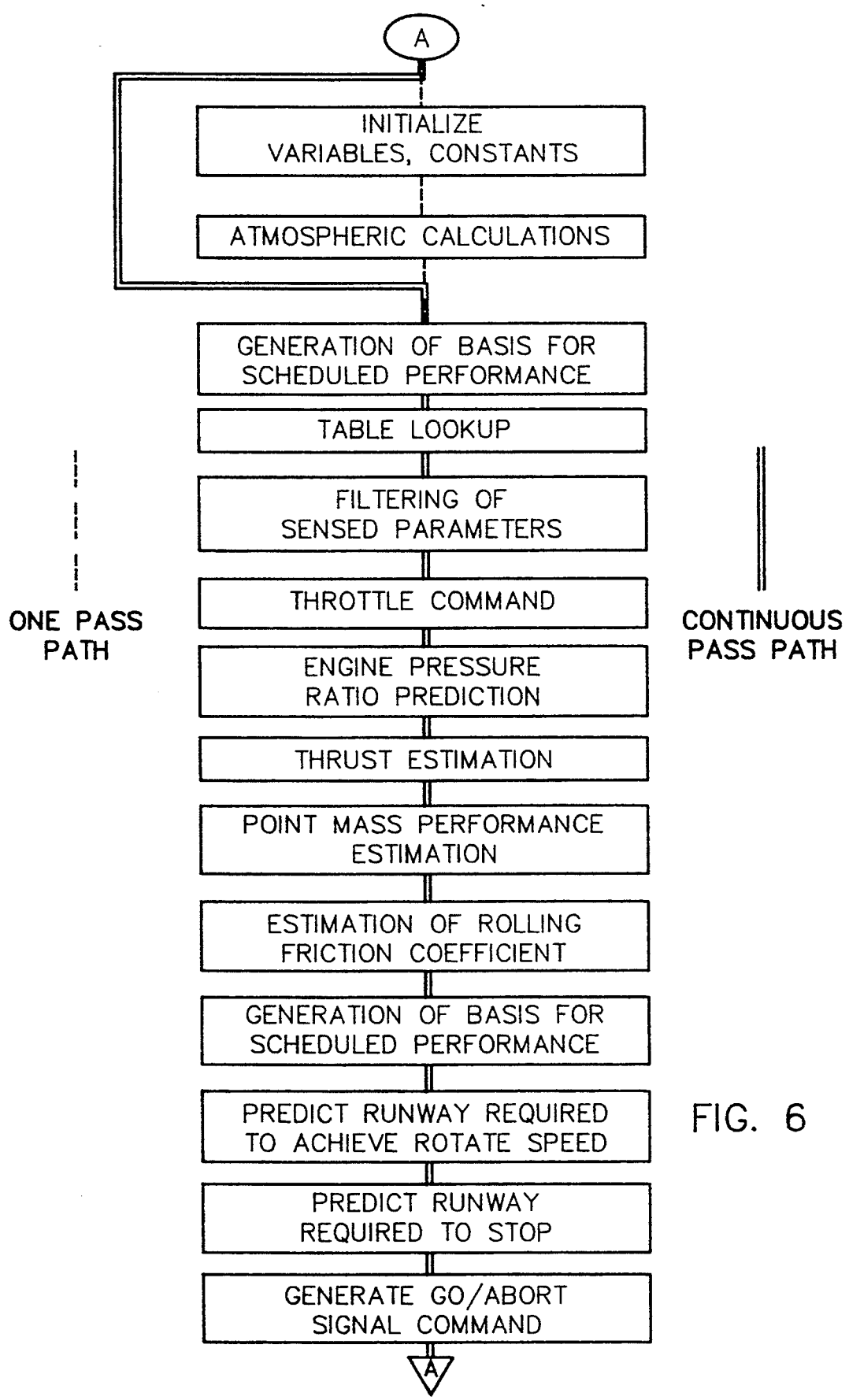
FIG. 6 is a flowchart of the real-time segment.

A block diagram of the real-time segment is shown in FIG. 6. This segment performs the following functions:
1. Initially calculates the required throttle setting for takeoff
2. Monitors the engine in terms of parameters such as engine pressure ratio, fuel flow, exhaust-gas temperatures, and engine rotational speed, i.e., R.P.M.
3. Monitors the performance of the airplane in terms of its acceleration performance
4. Estimates the runway rolling friction coefficient
5. Predicts the distance required to achieve rotation speed $V_R$
6. Predicts the distance required to stop the airplane
7. Generates GO/ABORT signals and
8. Computes runway available for rotation speed.

The real-time segment requires several input parameters. Some of these are one-time inputs while others are continuously needed inputs. Ambient temperature, ambient pressure, runway wind, weight, flap setting, stabilizer setting, runway available for rotation, i.e., distance to the ground roll limit line, runway available for stopping, and nominal rolling friction coefficient are one-time inputs, whereas throttle position, engine pressure ratio, ground speed, along track acceleration, and calibrated air speed are needed continuously.

The pressure altitude and ambient temperature inputs are used to compute the air density, and temperature and pressure ratios (atmospheric calculations) once during the real-time segment.

The generation of a basis for scheduled performance consists of interpolating between the sets of coefficients generated in the pretakeoff segment (equation 10) to obtain a set of coefficients corresponding to the input value for nominal rolling friction coefficient. This computation gives an initial basis for performance comparisons.

Two table lookups are performed in this segment. The first lookup obtains the flight manual recommended stabilizer setting for the given airplane loading configuration. The nominal lift and drag coefficients for the present takeoff roll, increments in lift and drag coefficients with full deflection of the flight and ground spoilers are also determined. The other lookup function is identical to the one in the pretakeoff segment.

Values for the continuously needed parameters are supplied by sensors on the airplane. Before use by the system these sensor outputs are processed through a filter implementation. The measured acceleration and ground speed are processed through a second order complementary filter to estimate the bias present in the acceleration signal as follows:

$$\underline{x}_{n+1} = \Phi \underline{x}_n + \Gamma \underline{u}_n \tag{11a}$$

where $\Phi$ and $\Gamma$ are filter constants and $$\underline{x} = \begin{bmatrix} x(1) \\ x(2) \end{bmatrix}$$

$$\underline{u} = \begin{bmatrix} V_G \\ a_M \end{bmatrix}$$

where $V_G$ is the ground speed sensor output and $a_M$ is the accelerometer output.

$$\hat{V}_G = x(1) \tag{11b}$$

where $\hat{V}_G$ is the filtered ground speed and $a_{F1}$ is the filtered acceleration.

$$a_{F1} = a_M + x(2) \tag{11c}$$

The acceleration output from the complementary filter ($a_{F1}$), measured values of engine pressure ratio (left and right), and calibrated air speed are passed through a first order lag filter to remove noise, and the outputs from this filter are the values used by the system.

From the manufacturer supplied engine model corresponding to the specific type of airplane involved, an empirical model of the steady state behavior of the engine pressure ratio and thrust is extracted and used to predict these parameters as follows:

$$EPR_{\substack{left \\ right}} = f(\delta_{th\substack{left \\ right}}, Temp_{total}) \tag{12}$$

$$THR_{\substack{left \\ right}} = f(EPR_{\substack{left \\ right}}, MACH) \tag{13}$$

A point mass formulation of the equations of motion is used to estimate the performance of the airplane. First the wind speed and measured ground speed are combined to obtain true air speed, Mach number and dynamic pressure. The nominal lift and drag coefficients yield the lift and drag forces. Combining these with the weight and rolling friction coefficient (input value), and the estimated thrust, based on measured engine pressure ratio, results in an estimated airplane acceleration. The measured ground speed is numerically integrated via rectangular integration to obtain distance along the runway.

The new estimate of the current air speed (CAS) is derived by summing the previously derived ground speed ($V_G$) and the head wind component of the runway wind speed ($V_{WRWY}$)

$$CAS = V_G + V_{WRWY}. \quad (14)$$

The new estimate of the head wind component of the runway wind speed ($V_{WRWY}$) is derived by adding the previous estimate of the head wind component of the runway wind speed ($V_{WRWY}$) to the difference between the measured current air speed (CAS) and the estimate of the calibrated air speed ($\widehat{CAS}$) derived in equation 14.

$$\widehat{V_{WRWY}} = V_{WRWY} + (CAS - \widehat{CAS}) \quad (15)$$

Another salient feature of this algorithm is the update of the runway friction coefficient in real-time. The estimation takes place as follows. First, the thrust is represented as a cubic in air speed $$THR = T_0 + T_1 v_T + T_2 v_T^2 + T_3 v_T^3. \quad (16)$$

At any true air speed, the acceleration corresponding to two rolling friction coefficients can be written as $$a = \left( \frac{g(T_0 - \mu_1 W) + T_1 v_T + }{(T_2 - \tfrac{1}{2}\rho S C_D + \tfrac{1}{2}\mu_1 S C_L) v_T^2 + T_3 v_T^3} \right) / W \quad (17a)$$

$$a = \left( \frac{g(T_0 - \mu_2 W) + T_1 v_T + }{(T_2 - \tfrac{1}{2}\rho S C_D + \tfrac{1}{2}\mu_2 S C_L) v_T^2 + T_3 v_T^3} \right) / W \quad (17b)$$

where
$\rho$ = air density
$S$ = wing area.

Subtracting a from a and solving for the difference in friction coefficients $$\Delta\mu = \mu_2 - \mu_1 \quad \Delta\mu = (a_1 - a_2)/(g(W - \tfrac{1}{2}\rho S C_L v_T^2)/W) \quad (18)$$

where
$\mu_2$ = estimate of the actual runway friction coefficient
$\mu_1$ = assumed friction coefficient
$\Delta\mu$ = estimated difference in the friction coefficients.

Thus the actual rolling friction coefficient is estimated as $$\widehat{\mu_2} = \mu_1 + \Delta\mu \quad (19)$$

Immediately after this process the basis for scheduled performance is recomputed with $\widehat{\mu_2}$ as the present estimate of the friction coefficient. This process can be repeated during the run as many times as appropriate.

The runway required to achieve rotation speed is computed by a ten step rectangular integration scheme between the present true air speed and the true air speed for rotation. The acceleration in each interval is assumed to remain constant at a value given by the scheduled performance basis for the true air speed at the midpoint of the interval.

To calculate the estimated stopping distance, the system simulates the effect of a series of commands to deploy the flight and ground spoilers, to reduce the throttle to an idle setting, and to apply full braking. The computations are based on the following assumptions:

1. The flight and ground spoilers are commanded through servos modelled as first order lags.
2. With full braking the rolling friction coefficient is increased by a constant amount over the present value. A more sophisticated model can be substituted.
3. Maximum wheel braking is achieved in a ramp fashion per given time period.
4. Thrust is assumed to vary linearly with throttle position from the present value to idle thrust, reaching idle thrust for a throttle position of zero.
5. Changes in lift and drag coefficients produced by flight and ground spoilers are assumed to vary linearly with deflection.

Using these assumptions in a numerical integration scheme based on incremental time, the stopping distance is computed in a point mass formulation with the lift and drag coefficients computed as $$C_L = C_{Lnominal} + \Delta C_{LFSP} = \Delta C_{LGSP} \quad (20a)$$

$$C_D = C_{Dnominal} + \Delta C_{DFSP} + \Delta C_{DGSP} \quad (20b)$$

where the subscripts FSP and GSP respectively denote flight spoilers and ground spoilers, and the friction coefficient is computed as $$\mu = \mu_{nominal} + \Delta\mu_{brake}. \quad (20c)$$

The engine pressure ratio is used as a check on engine status. After allowing time for the engine transients to die out, the measured value is compared with the predicted value corresponding to the measured throttle position. If this difference is more than a preselected limit an engine failure flag is set for each engine.

$$\frac{|EPR - \widehat{GPR}|}{EPR} > EPR_{error\ limit} \quad (21)$$

Similar differences in other engine parameters could also be incorporated. At any time after the rolling friction coefficient is estimated, any difference between the measured and the predicted acceleration which exceeds a preselected limit causes a performance failure flag to be set.

$$\left| \frac{a - \hat{a}}{a} \right| > a_{error\ limit} \quad (22)$$

Based on these flags and other particular conditions, the following situation advisory signals are generated:

1. A "NULL" advisory signal will exist indicating that the takeoff is proceeding satisfactorily when no engine or performance flags are set and there is adequate distance left to stop on the runway or to reach rotation speed before reaching the ground roll limit for safe takeoff, viz., the "ground roll-limit line".
2. A "GO" advisory signal will result when zero or one engine-failure flags are set, the airplane can still reach rotation speed before reaching the ground roll-limit line, and the runway remaining is less than that required for stopping the airplane.
3. "ABORT" advisory signals will result when:

(a) The runway length available for reaching rotation speed is less than required;
(b) A performance-failure flag is set;
(c) One engine-failure flag is set at a speed less than decision speed;
(d) Multiple engine flags are set.

4. Optionally, an "OPTION" advisory signal can result indicating that both the GO and ABORT options are available when one engine-failure flag is set at a speed equal to or greater than decision speed, the airplane can reach rotation speed before reaching the ground roll-limit line, and the runway distance remaining is greater than that required for stopping.

Figure 7A:
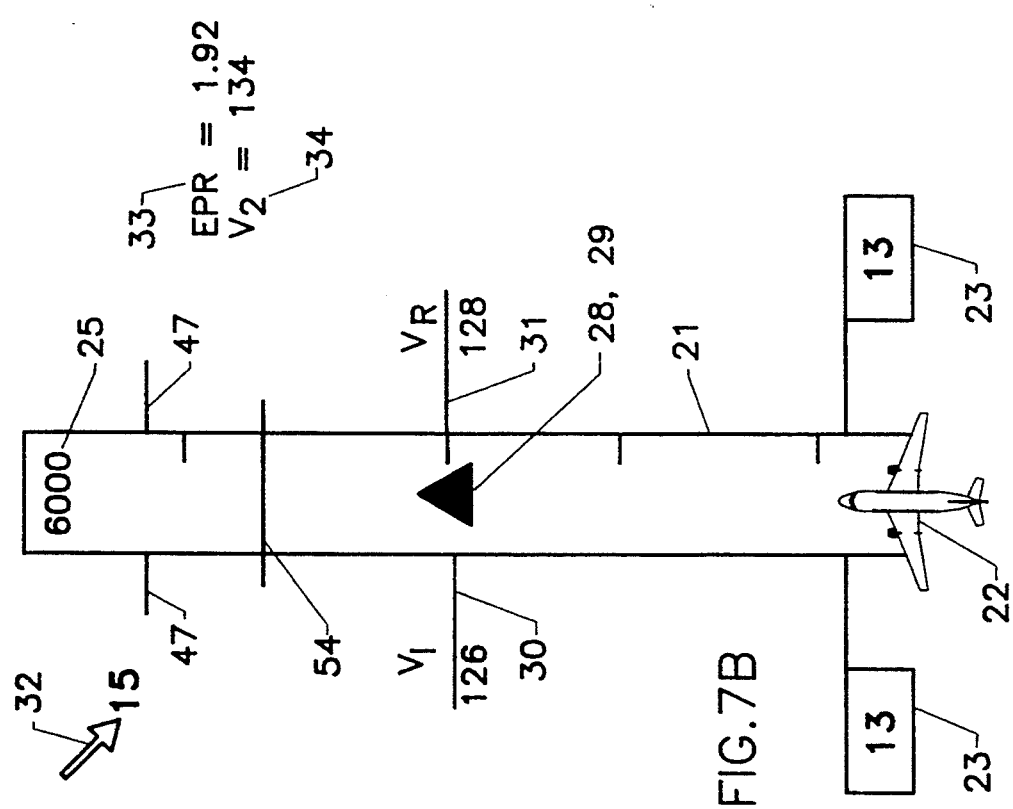
FIG. 7A depicts the head-down display presented to the pilot indicating the minimum field length for a particular set of takeoff conditions.

As stated previously, the system algorithm is composed of two segments. The pretakeoff segment is activated prior to the start of the takeoff roll, when the pilot enters ambient condition, loading and configuration information into the system through an appropriate input device such as the NCDU 17. Once the pretakeoff computations are complete, the head-down display, the HSI in the preferred embodiment, presents the format shown in FIG. 7A. The number at the departure end of the runway, shown as 4556 in the figure, represents the minimum field length (MFL) calculated for the given conditions. The minimum field length is the initial ground roll distance plus the greater of the remaining distance needed for the airplane to clear a predetermined height at the departure end of the runway, e.g., 35' in the preferred embodiment, after experiencing an engine failure at decision speed, or the distance required to brake to a stop after experiencing the same engine failure. The initial ground roll distance is the distance required for the airplane to attain rotation speed using nominal thrust.

At the lower end of the runway graphic 21 is an airplane symbol 22 whose nose marks current longitudinal position. Tracking the lateral movement of the airplane on the runway was de-implemented, because it was considered distracting to the pilot. The calibrated air speed (CAS) symbol 23 consists of boxes connected by a horizontal line located at the same distance down the runway 21 as the nose of the airplane 22. The numbers inside the boxes represent calibrated air speed (CAS) in knots. Note that the nose of the airplane is about 400 ft. from the starting end of the runway; this increment is the "runway offset", representing where the on-ramp being used intersects the runway. The takeoff roll begins here.

Further up the runway, a shaded triangle 29 is shown; the apex indicates the longitudinal position where $V_R$ will be achieved, based on current conditions. The line 31 to the right of the runway, i.e., opposite the apex of the triangle, further denotes this position, and the number 128 beneath it gives $V_R$ in knots. Similarly, the number and line 30 on the left side indicate the $V_1$ speed and where it will be achieved.

In reality, there are two triangles, one lying on top of the other—the shaded one 29 representing the real-time prediction of where $V_R$ will be achieved and an open triangle 28 marking the initial prediction of where it should occur. The open triangle 28 is thus stationary, but the solid triangle 29 and the $V_1$ 30 and $V_R$ 31 lines move to indicate the updated estimates based on deviations away from nominal conditions.

Just above the position of the triangles is a line 54 that stretches across the runway. This line 54 represents the ground roll limit for reaching $V_R$.

The arrow 32 at the top left of the display represents the wind direction (relative to the runway) and the number beside it represents the wind speed in knots.

The recommended takeoff Engine Pressure Ratio (EPR) setting 33 and the second segment climb speed ($V_2$) 34 in knots are shown at the bottom left corner of the display for reference.

Figure 7B:
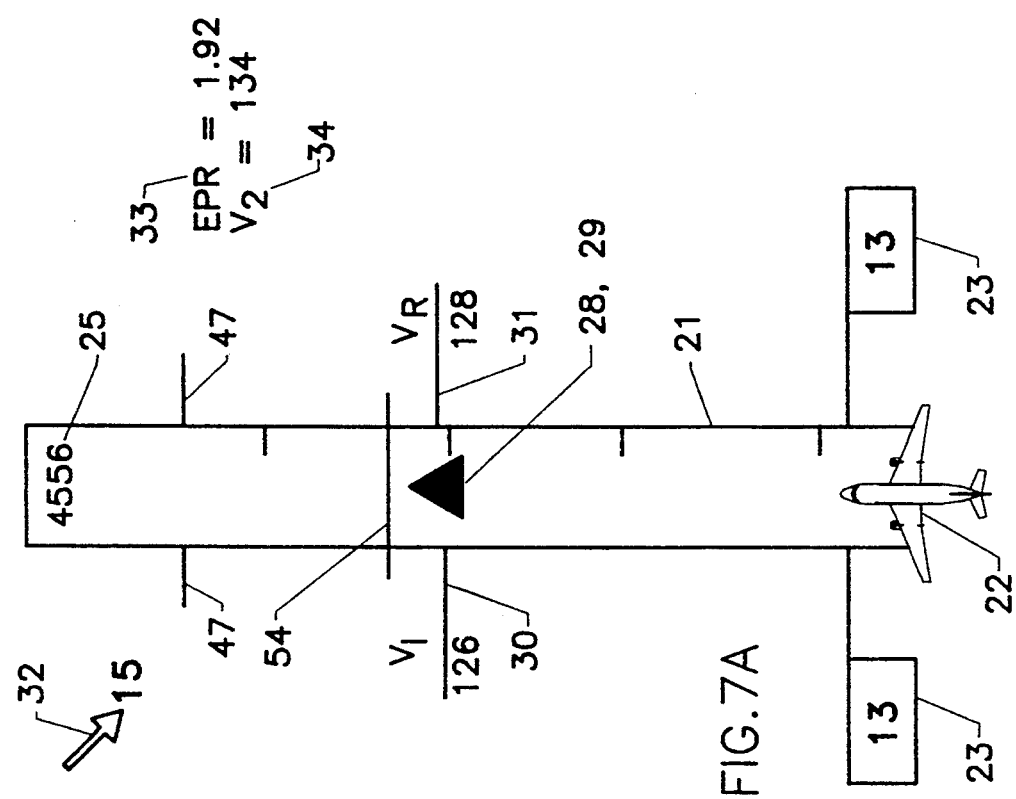
FIG. 7B depicts the graphic rescaling that occurs on the head-down display after the pilot enters the actual runway length.
Figure 7C:
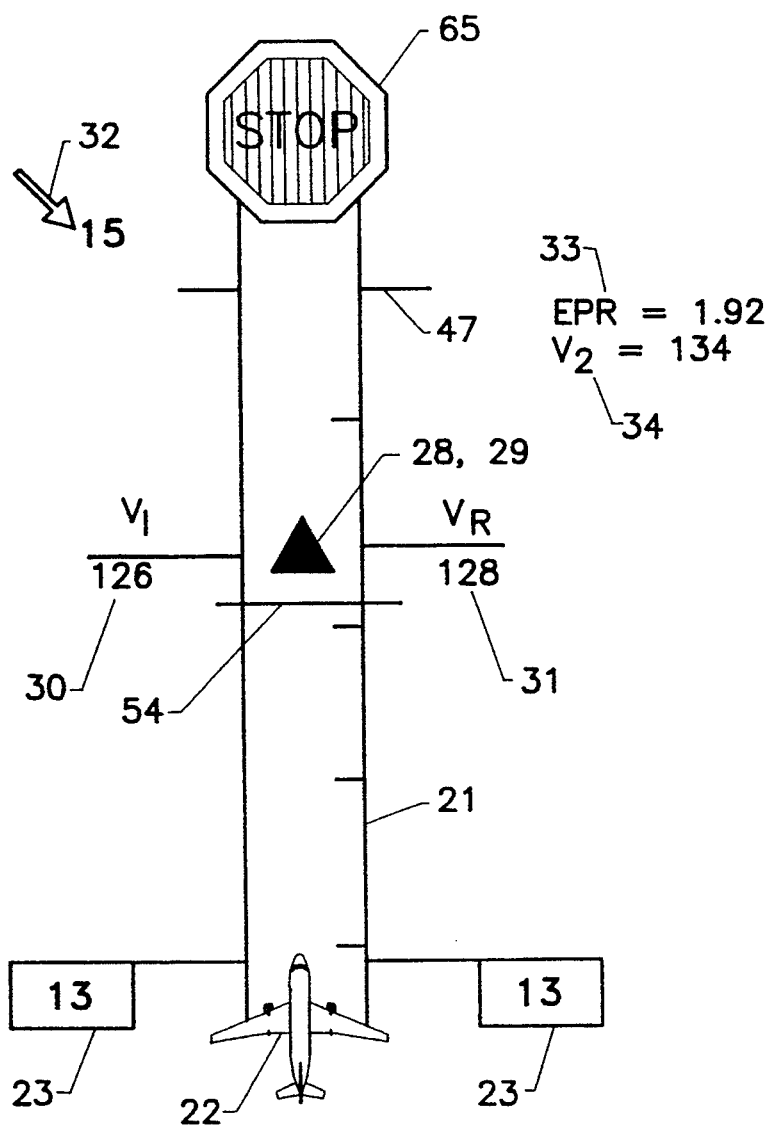
FIG. 7C shows a situation advisory flag warning the pilot that the runway length is insufficient for takeoff under typical conditions.
Figure 7D:
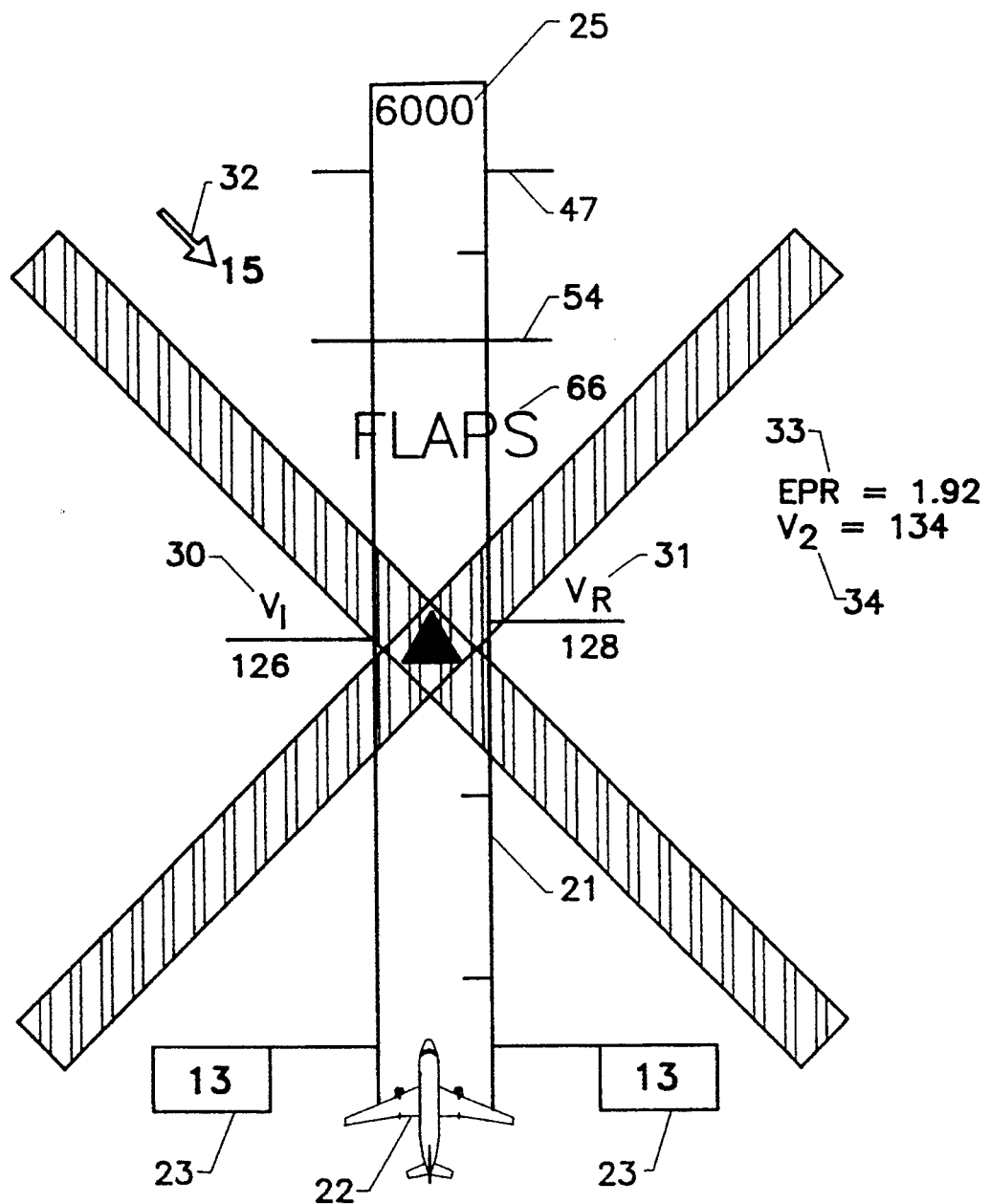
FIG. 7D depicts the takeoff display resulting from the airplane flap lever being positioned in the wrong detent when the takeoff begins.

Prior to takeoff, the pilot enters the actual runway length. The system rescales the runway accordingly and inserts the actual runway length in place of the MFL as illustrated in FIG. 7B. In the event that the runway length is too short for a safe takeoff, the situation advisory flag 65, configured as a "STOP" sign, warns the pilot as illustrated in FIG. 7C. Note that the triangles 28, 29 are positioned forward across the ground roll limit line, thus indicating that rotation will be achieved too close to the end of the runway to takeoff and clear a specified height if one engine should fail at or after decision speed is reached. If the flap lever is not positioned correctly when the takeoff roll begins, i.e., if it is different from the position used by the algorithm for the pretakeoff calculations, the display will appear as shown in FIG. 7D, where the large "X" 40 across the full display warns against takeoff. A word message 66, e.g., "FLAPS", also appears.

The head-up display presented prior to take off is depicted in FIG. 7E. The thick line 51 across the front of the shaded rectangle at the bottom of the runway graphic denotes longitudinal position of the airplane. The apex of the triangle 52 halfway down the runway shows the predicted position where rotation speed ($V_R$) will be reached. The numeric "13" 53 denotes pretakeoff air speed in this case, due to a 13-kt head wind. The horizontal line 54 across the runway at this position indicates the limit of the distance available for the airplane to reach rotation speed $V_R$. Engine-pressure-ratio (EPR) bars 56,57 emanate forward from this position, but are not yet visible on the display, because the engines are still at idle.

FIG. 8A illustrates the head-down display depicting a situation with the airplane well into the takeoff run. From the divergence of the triangles 28, 29, it is apparent that the airplane is performing in excess of the predicted nominal performance, because the most recent prediction indicates that rotation speed will be attained at the apex of 29 in less distance than the original nominal prediction at the apex of 28. The EPR bars 56, 57 extend beyond the EPR target line 47, indicating that the throttles are set higher then recommended, thus causing the over performance.

FIG. 8B represents the head-down display of a situation where the airplane performance is below expectation, that is, it is taking more distance than expected to achieve rotation speed. Since the EPR bars 56, 57 are below the EPR target line and show no signs of engine failure, the under performance is verified to be caused by a lower than recommended throttle setting.

Figure 8C:
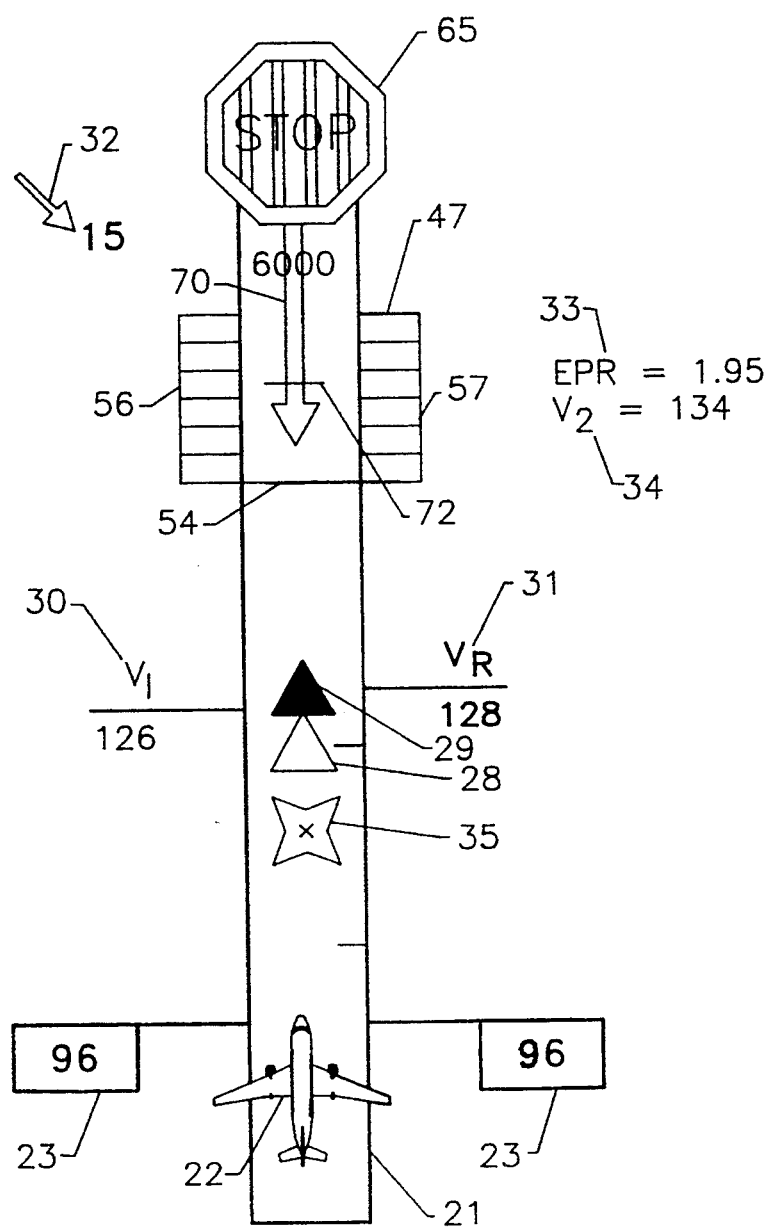
FIG. 8C shows the head-down display indicating a correct thrust and acceleration performance deficiency greater than a specified value.

FIG. 8C shows a head-down display that contains a situation advisory flag 65 at the far end of the runway symbol 21 and an acceleration-error arrow 70. Whenever the acceleration error is less than some lower limit, e.g., 5% used in the preferred embodiment, there is no flag or arrow; however, for larger errors the arrow grows linearly toward the approaching airplane symbol 22. When the error arrow reaches an unacceptable-limit line 72, e.g. 15% in the preferred embodiment, the situation advisory flag 65 and star 35 indicating the predicted stop point appear. The GRLL 54 could double as limit line 72. In FIGS. 8A and 8B, there were no advisory flags or error arrows because the higher or lower than nominal accelerations were not considered errors since they were nominal for the throttle settings being used.

Figure 8D:
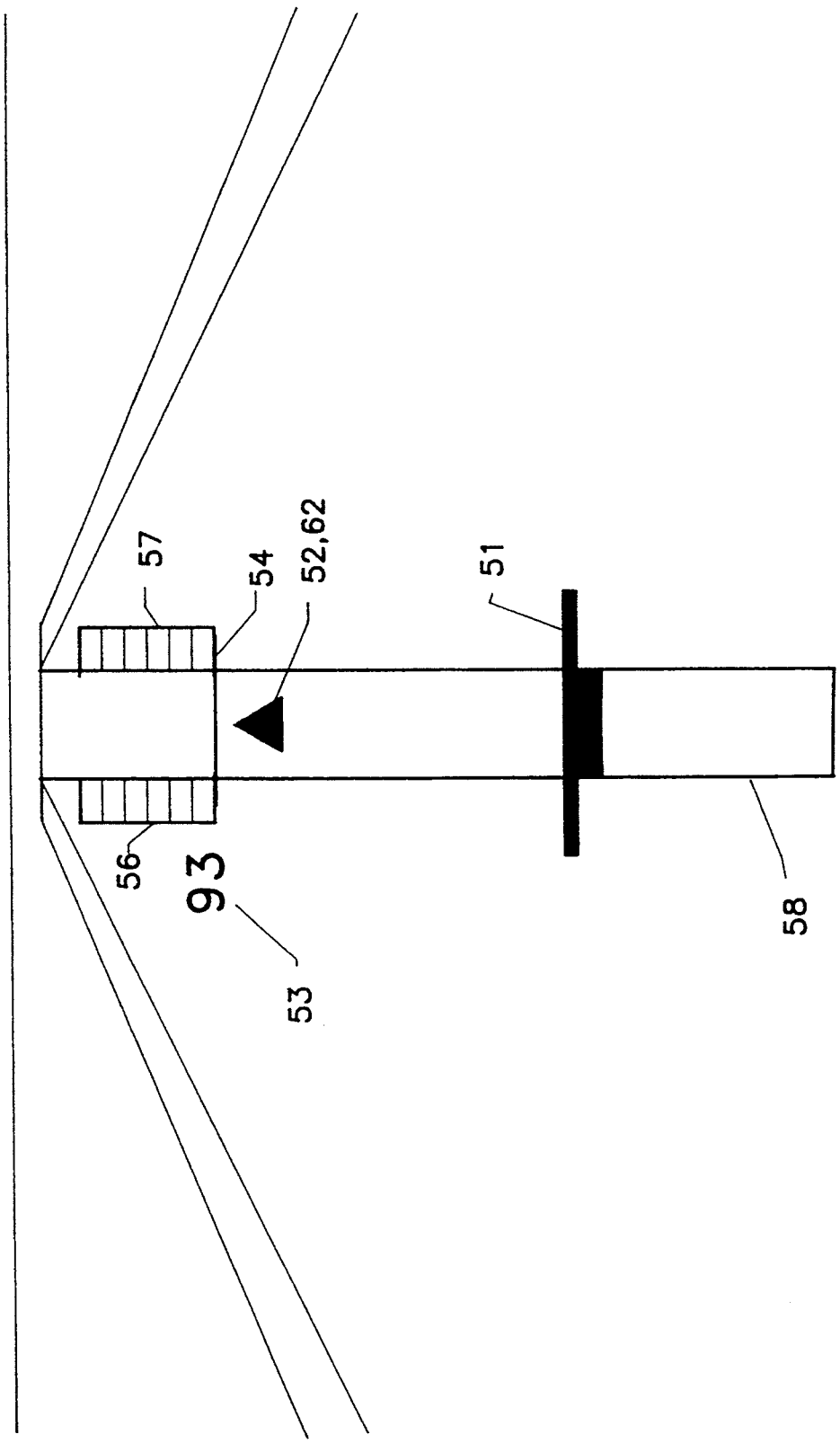
FIG. 8D depicts the head-up display presented to the pilot indicating an acceptable takeoff underway, with essentially no acceleration deficiency.

FIG. 8D depicts the head-up display for an acceptable takeoff underway on a near-minimum length runway for the existing conditions. The two triangles 52, 62 are superimposed and remain so as long as acceleration performance is nominal. The EPR bars 56,57 indicate that both engines are operating satisfactorily and at approximately the same level.

Figure 9A:
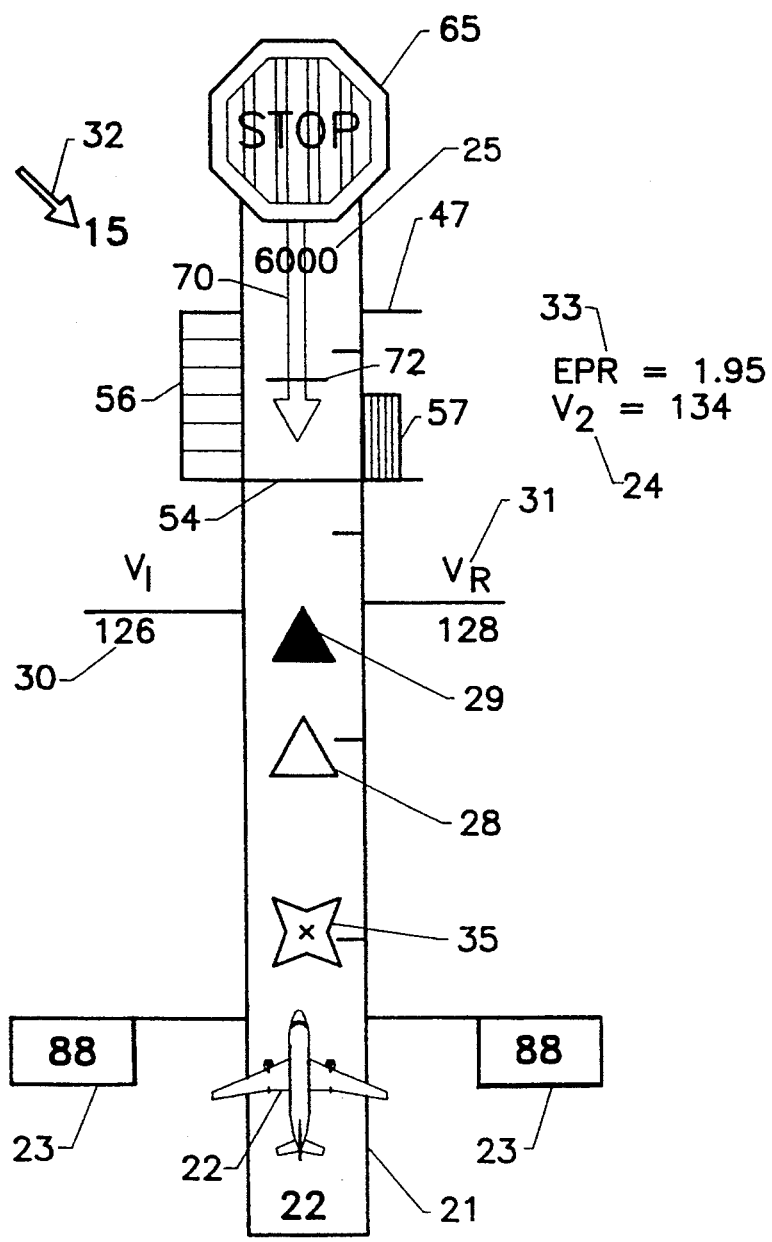
FIG. 9A shows the head-down display indicating that the performance of an engine has become unacceptable prior to attainment of decision speed.

FIG. 9A shows the head-down display that appears when the performance of an engine becomes unacceptable before decision speed is attained. The EPR bar on the right side 57 diminishes in length and changes color to indicate the failure, and the situation advisory flag 65 (STOP sign) appears. The star 35 indicates where the airplane will stop with the application of maximum wheel braking and fully deployed spoilers. Because of the decrease in thrust, the acceleration-error arrow 70 also appears.

Figure 9C:
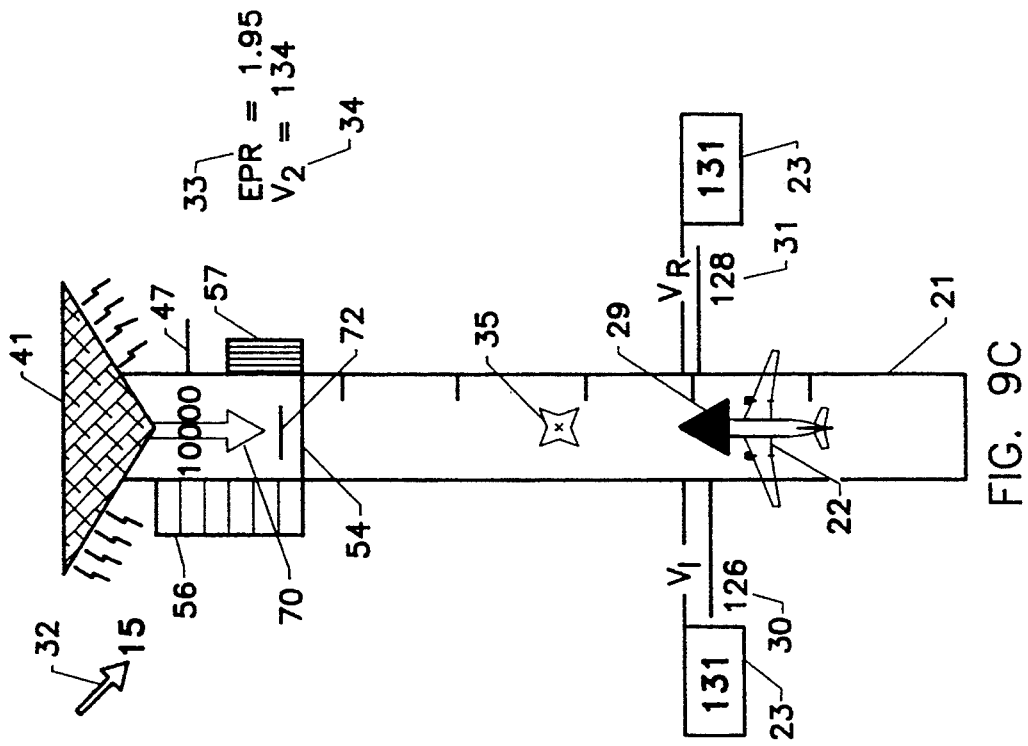
FIG. 9C shows the head-down display where both GO and STOP options remain possible by providing inadequate thrust, even though an engine has become "inoperative"
Figure 9B:
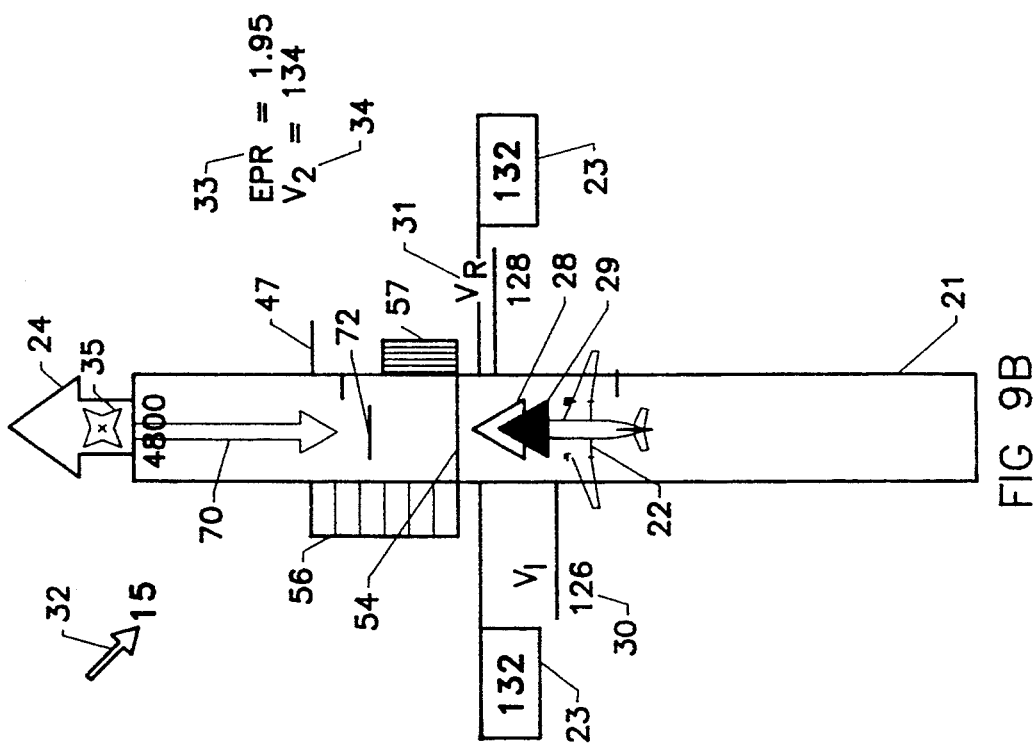
FIG. 9B shows the head-down display indicating that the performance of an engine has become unacceptable after attainment of decision speed and where inadequate stopping distance remains.

FIG. 9B depicts the head-down display where the performance of an engine becomes unacceptable after decision speed V₁ has been attained. The location of the star 35 beyond the end of the runway indicates that inadequate stopping distance remains. The situation advisory flag 24, which may be green, recommends continuing with takeoff in spite of the engine failure indication 57, because insufficient runway remains for stopping. Because of the decrease in thrust, the acceleration-error arrow 70 also appears.

FIG. 9C illustrates the head-down display where the performance of an engine becomes unacceptable after decision speed has been achieved, but where adequate stopping distance is still available. The situation advisory flag 41 is presented as a flashing amber inverted triangle to indicate that both GO and STOP options are available although current FAA regulations might require the pilot to proceed with takeoff.

Figure 9D:
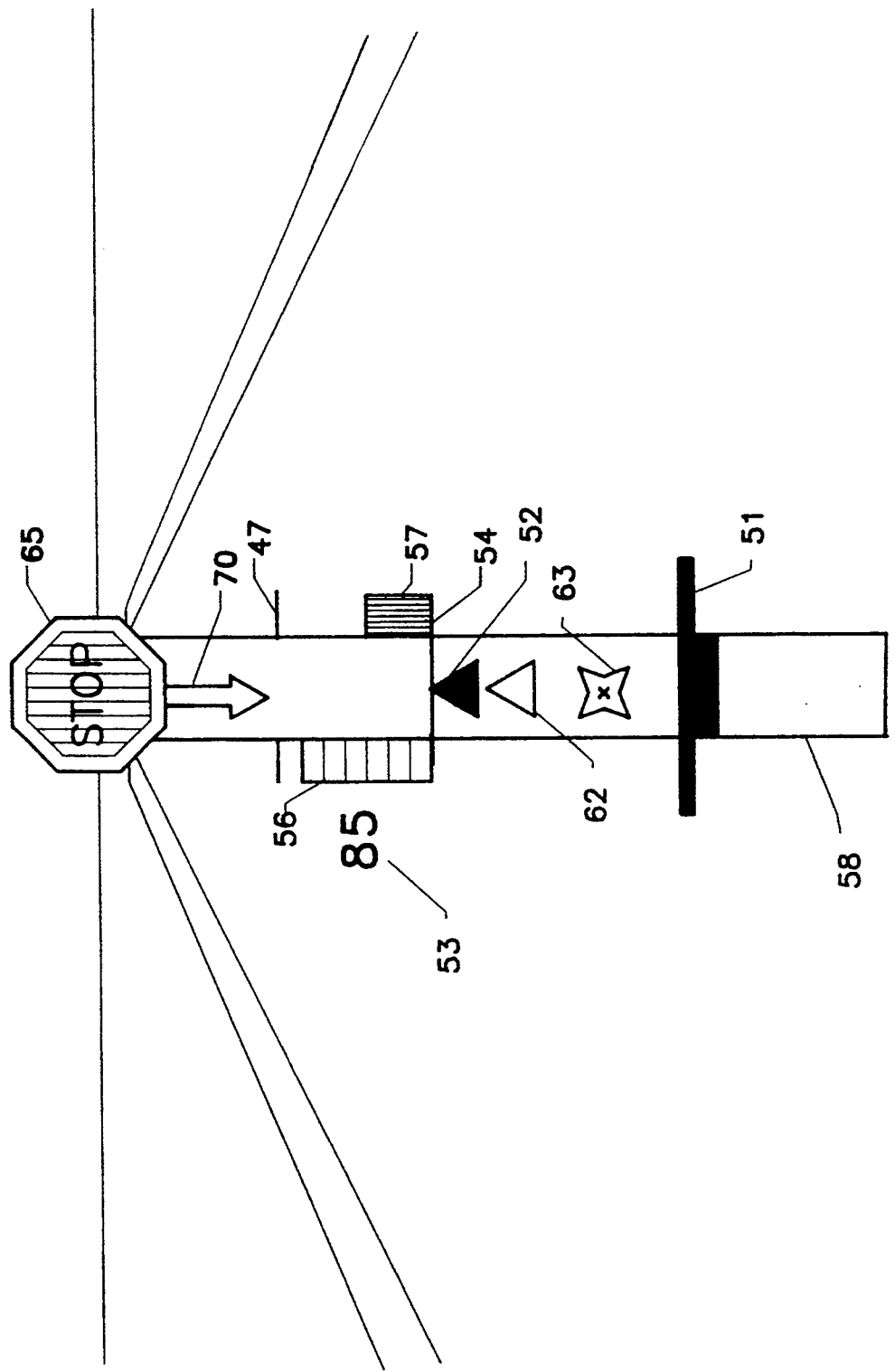
FIG. 9D shows the head-up display indicating that the performance of an engine has become unacceptable before attainment of decision speed.

FIG. 9D shows the head-up display for the same situation depicted in FIG. 9A, i.e., right-engine failure at about 85 knots on a runway somewhat longer than a minimum field. The EPR bar on the right side 57 has turned red and is shrinking, the acceleration-error arrow 70 is growing, and the red situation advisory flag (STOP sign) 65 has appeared. Further, the triangles 52,62 have separated significantly. Just ahead of the airplane symbol, 51, the star symbol 63 has appeared indicating the point at which calculations indicate the airplane will stop if maximum braking is initiated immediately.

The acceleration-error arrow 70 shown in FIGS. 8C and 9A–D can be programmed to disappear from the display when the abort flag 65 appears, or it can remain on the screen until the abort maneuver is initiated.

Figure 10A:
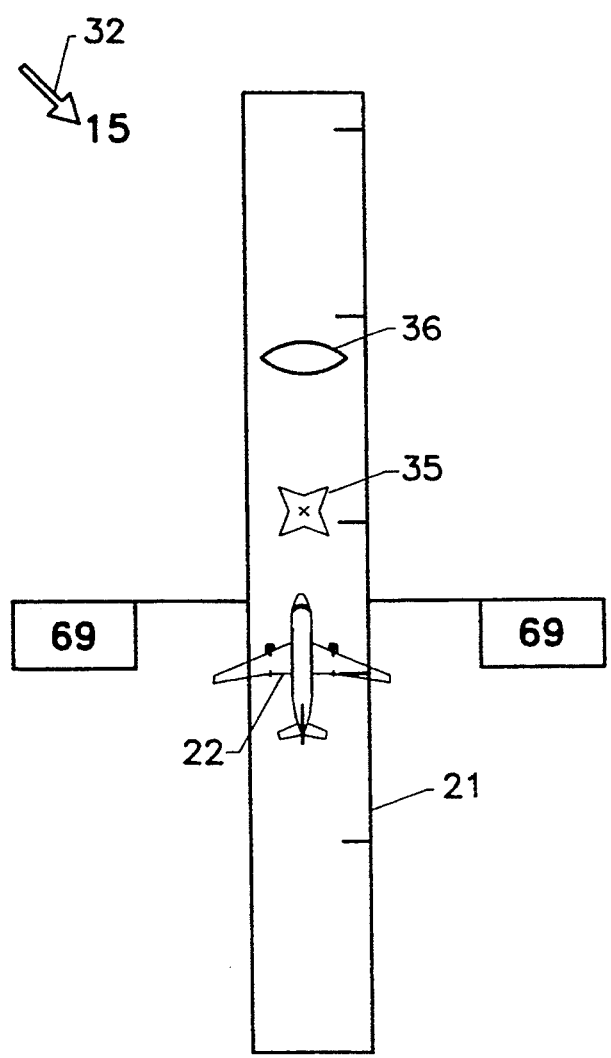
FIG. 10A shows the head-down display presented to the pilot in a landing or abort situation.

The initiation of an abort executed by a rapid pull back of the throttles causes most of the takeoff information to be removed from the head-down display leaving only information pertinent to the abort. FIG. 10A shows an head-down abort display. The shaded and open triangles, the V₁ and V_R lines, the ground roll limit line, the V₂ and EPR numerics, the wind vector, the acceleration-error arrow, and the engine flags disappear from the display. However, the calibrated air speed 23 in the box to the left of the airplane symbol is replaced by ground speed in knots. The star 35, however, remains, representing the stop point using maximum braking, full spoilers, but no reverse thrust, and a new oval symbol 36 appears on the display. This new symbol 36 indicates the position where the airplane will stop using the present level of deceleration, in this case is less than full braking.

FIG. 10B shows the head-up abort display for the same situation as shown in FIG. 10A. As with the head-down display, all takeoff-related information has disappeared and the only symbols left are the airplane 51, its ground speed 53, the predicted stop-point using maximum braking 63 and the predicted stop-point using the current level of measured acceleration 64. This display also shows that less than full braking is being applied.

In the preferred embodiment, specific colors and shapes of the situation advisory flag(s) have specific meanings for different conditions, viz.:

| COLOR/ SHAPE | FLIGHT CONDITION | RECOMMENDATION |
| --- | --- | --- |
| No Flag | (1) Takeoff is proceeding normally | Continue takeoff |
| Green/ Arrow | (2) Airplane can reach VR before reaching ground-roll limit line, but its predicted stop point is beyond end of runway. | Takeoff |
|  | (3) One engine has failed at a speed greated than V1; the airplane can still reach VR before reaching ground roll limit line, but its predicted stop point is beyond the end of the runway. | Takeoff |
| Amber/ Triangle (Blinking) | (4) Same as (3) except airplane predicted stop point is on the runway. | Continue or abort the takeoff (pilot option) |
| Red/ Stop-sign | (5) Airplane will reach VR after it has passed the ground roll limit line. | Abort |
|  | (6) Multiple engines fail. | Abort |
|  | (7) One engine fails at speed less than V1. | Abort |
|  | (8) Longitudinal acceleration is not within a specified percentage of the nominal value determined by the algorithm. | Abort |

A failed engine is indicated by change in the length and color of the associated EPR bar—attached to the side of the runway graphic. Specifically, the bar shrinks in length and turns red when the EPR error exceeds a specified amount.

A performance arrow indicates deviation of the measured longitudinal acceleration from the nominal acceleration curve of values determined by the algorithm for the throttle setting being used. When the deviation exceeds a specified limit (see advisory flag condition (8) above), the abort flag comes on.

FIG. 11 depicts the head-up display employing a displayed acceleration-error arrow 70. The acceleration-error is a function of the difference between a predicted airplane acceleration and a currently measured airplane acceleration. The arrow 70 grows from the end of runway 58 toward the approaching plane 51 as a function of the acceleration fluctuations. In a preferred embodiment, arrow 70 appears when the acceleration error is at a minimum of, e.g., 5%, and is scaled to reach line 54 when the error is at a maximum of, e.g., 15%, at which time a stop advisory flap 65 would appear. The acceleration-error arrow is also implemented on the head-down displays, as already shown on FIGS. 8C, 9A, 9B, 9C, and 9D.

What is claimed as new and desired to be secured by Letters Patent of the United States is:

1. In an airplane takeoff and landing performance monitoring system with a display means for graphically and continuously depicting the position of an airplane on a runway, the improvement comprising:

means for generating a value indicative of a rotation speed of the airplane necessary to achieve take-off;

means for continuously displaying both a stationary symbol indicative of an initial prediction of a position where the rotation speed should occur and a movable symbol indicative of a current prediction of a position where the airplane will reach the rotation speed on the runway wherein the movable symbol is superimposed on the stationary symbol when there is no difference between the initially predicted position of the airplane and currently predicted position of where the airplane will reach the rotation speed and wherein the movable symbol is spatially distanced from the stationary symbol along the runway when there is a difference between the initially predicted position and the currently predicted position;

means for continuously displaying a fixed indicator indicative of a recommended engine operating condition on said display means;

means for continuously displaying a movable indicator indicative of actual engine operating status in a spatial manner on said display means relative to the displayed fixed indicator; and means for altering the appearance of the movable indicator indicative of actual engine operating status in response to a difference between the actual engine operating status and a computed engine operating exceeding a predetermined tolerance level.

2. The monitoring system according to claim 1, further comprising means for displaying an abort symbol when an acceleration error of the airplane exceeds a specified tolerance band, wherein the acceleration error is defined by a difference in a measured acceleration of the airplane and a predicted acceleration of the airplane.

3. The monitoring system according to claim 2, further comprising means for displaying a symbol on the displayed runway indicative of where the airplane can be stopped when the abort symbol is displayed.

4. The monitoring system according to claim 2, further comprising means for displaying a go symbol when the acceleration error is within the specified tolerance band and the current speed of the airplane exceeds a predetermined decision speed.

5. The monitoring system according to claim 2, further comprising means for displaying a go symbol when the airplane acceleration error falls within the specified tolerance band and inadequate runway remains for the airplane to stop in a determined safe manner.

6. The monitoring system according to claim 1, wherein the means for continuously displaying a movable indicator indicative of actual engine operating status displays a first movable indicator on the right side of the runway indicative of the actual operating status of a right engine of the airplane and a second movable indicator on the left side of the runway indicative of the actual operating status of a left engine of the airplane.

7. The monitoring system according to claim 1, further comprising means for displaying a symbol on the displayed runway indicative of a position of a ground roll limit distance, wherein the ground roll limit distance is defined as the distance required for the airplane to reach the rotation speed at a nominal thrust.

8. The monitoring system according to claim 2, further comprising means for displaying a symbol on the displayed runway indicative of a position of a ground roll limit distance, wherein the ground roll limit distance is defined as the distance required for the airplane to reach the rotation speed at a nominal thrust.

9. The monitoring system according to claim 1, wherein the size of movable indicator indicative of the actual engine operating status corresponds to the actual engine operating status.

10. The monitoring system according to claim 2, further comprising means for displaying an error symbol when a difference between the measured acceleration of the airplane and the predicted acceleration exceeds a minimum determined acceleration error, wherein the length of the error symbol corresponds to a current difference between the measured acceleration and the predicted acceleration.

11. A method of monitoring an airplane takeoff and landing performance including graphically and continuously depicting the position of an airplane on a displayed runway, the improvement comprising:

generating a value indicative of a rotation speed necessary to achieve takeoff;

continuously displaying a stationary symbol on the runway indicative of an initial prediction of a position where the rotation speed of the airplane necessary to achieve take-off should occur;

continuously displaying a movable symbol indicative of a current prediction of a position where the rotation speed should occur, wherein the movable symbol is superimposed on the stationary symbol when there is no difference between the initially predicted position where the rotation speed of the airplane should occur and currently predicted position where the rotation speed of the airplane shall occur, wherein the movable symbol is spatially distanced from the stationary symbol along the runway when there is a difference between the initially predicted position and the currently predicted position;

continuously displaying a fixed indicator indicative of a predicted engine operating condition on said display means;

continuously displaying a movable indicator indicative of actual engine operating status in a spatial manner on said display means relative to the displayed fixed indicator; and altering the appearance of the movable indicator indicative of actual engine operating status in response to a difference between the actual engine operating status and a computed engine operating status exceeding a predetermined tolerance level.

12. The monitoring method according to claim 11, further comprising displaying an abort symbol when an acceleration error of the airplane exceeds a specified tolerance band, wherein the acceleration error is defined by a difference in a measured acceleration of the airplane and a predicted acceleration of the airplane.

13. The monitoring method according to claim 12, further comprising displaying a symbol on the displayed runway indicative of where the airplane can be stopped when the abort symbol is displayed.

14. The monitoring method according to claim 12, further comprising displaying a go symbol when the acceleration error is within the specified tolerance band and the current speed of the airplane exceeds a predetermined decision speed.

15. The monitoring method according to claim 12, further comprising displaying a go symbol when the airplane acceleration error falls within the specified tolerance band and inadequate runway remains for the airplane to stop in a determined safe manner.

16. The monitoring method according to claim 11, wherein the step of continuously displaying a movable indicator indicative of actual engine operating status comprises displaying a first movable indicator on the right side of the runway indicative of the actual operating status of a right engine of the airplane and displaying a second movable indicator on the left side of the runway indicative of the actual operating status of a left engine of the airplane.

17. The monitoring method according to claim 11, further comprising displaying a symbol on the displayed runway indicative of a position of the ground roll limit distance, wherein the ground roll limit distance is defined as the distance required for the airplane to reach the rotation speed at a nominal thrust.

18. The monitoring method according to claim 12, further comprising displaying a symbol on the displayed runway indicative of the position of a ground roll limit distance, wherein the ground roll limit distance is defined as the distance required for the airplane to reach the rotation speed at a nominal thrust.

19. The monitoring method according to claim 13, wherein the length of movable indicator indicative of the actual engine operating status corresponds to the actual engine operating status.

20. The monitoring method according to claim 12, further comprising displaying an error symbol when a difference between the measured acceleration and the predicted acceleration of the airplane exceeds a minimum determined acceleration error, wherein the size of the error symbol corresponds to the current difference between the measured acceleration and the predicted acceleration.

21. In an airplane takeoff and landing performance monitoring system with a display means for graphically and continuously depicting the position of an airplane on a runway, the improvement comprising:

means for generating a value indicative of rotation speed of the airplane necessary to achieve take-off;

means for continuously displaying both a stationary symbol indicative of an initial prediction of a position where the rotation speed should occur and a movable symbol indicative of a current prediction of a position where the airplane should reach the rotation speed on the runway wherein the movable symbol is superimposed on the stationary symbol when there is no difference between the initially predicted position of the airplane and currently predicted position of where the airplane should reach the rotation speed and wherein the movable symbol is spatially distanced from the stationary symbol along the runway when there is a difference between the initially predicted position and the currently predicted position;

means for displaying an abort symbol when an acceleration error of the airplane exceeds a specified tolerance band, wherein the acceleration error is defined by a difference in a measured acceleration and an initially predicted acceleration of the airplane; and means for displaying an error symbol when a difference between the measured acceleration of the airplane and the predicted acceleration exceeds a minimum determined acceleration error, wherein the length of the error symbol corresponds to a current difference between the measured acceleration and the predicted acceleration.

22. A method of monitoring an airplane takeoff and landing performance including graphically and continuously depicting the position of an airplane on a displayed runway, the improvement comprising:

generating a value indicative of a rotation speed necessary to achieve takeoff;

continuously displaying a stationary symbol on the runway indicative of an initial prediction of a position where the rotation speed of the airplane necessary to achieve take-off should occur;

continuously displaying a movable symbol on the runway indicative of a current prediction of a position where the rotation speed should occur, wherein the movable symbol is superimposed on the stationary symbol when there is no difference between the initially predicted position where the rotation speed of the airplane should occur and currently predicted position of where the rotation speed of the airplane should occur, wherein the movable symbol is spatially distanced from the stationary symbol along the runway when there is a difference between the initially predicted position and the currently predicted position;

displaying an abort symbol when an acceleration error of the airplane exceeds a specified tolerance band, wherein the acceleration error is defined by a difference in a measured acceleration of the airplane and to initially predict acceleration of the airplane; and displaying a symbol on the displayed runway indicative of the position of a ground roll limit distance, wherein the ground roll limit distance is defined as the distance required for the airplane to reach the rotation speed at a nominal thrust.

* * * * *